US012560704B2

(12) United States Patent
Kim et al.

(10) Patent No.: US 12,560,704 B2
(45) Date of Patent: Feb. 24, 2026

(54) APPARATUS AND METHOD WITH RADAR

(71) Applicants: Samsung Electronics Co., Ltd.,
Suwon-si (KR); The Industry &
Academic Cooperation in Chungnam
National University (IAC), Daejeon
(KR)

(72) Inventors: Jong-Sok Kim, Hwaseong-si (KR);
Byungkwan Kim, Daejeon (KR);
Sungdo Choi, Suwon-si (KR)

(73) Assignees: Samsung Electronics Co., Ltd.,
Suwon-si (KR); The Industry &
Academic Cooperation in Chungnam
National University (IAC), Daejeon
(KR)

( * ) Notice: Subject to any disclaimer, the term of this
patent is extended or adjusted under 35
U.S.C. 154(b) by 482 days.

(21) Appl. No.: 17/948,373

(22) Filed: Sep. 20, 2022

(65) Prior Publication Data

US 2023/0280461 A1 Sep. 7, 2023

(30) Foreign Application Priority Data

Mar. 2, 2022 (KR) ........................ 10-2022-0026857

(51) Int. Cl.
*G01S 13/931* (2020.01)
*G01S 13/89* (2006.01)
(52) U.S. Cl.
CPC ............ *G01S 13/931* (2013.01); *G01S 13/89*
(2013.01)
(58) Field of Classification Search
CPC ............................... G01S 13/931; G01S 13/89
See application file for complete search history.

(56) References Cited

U.S. PATENT DOCUMENTS 9,595,974 B1 * 3/2017 Pereira .................. H03M 1/164
9,599,702 B1 * 3/2017 Bordes .................... G01S 13/18
(Continued)

FOREIGN PATENT DOCUMENTS

KR 10-2015-0012727 A 2/2015

OTHER PUBLICATIONS

Jing, Hao et al. Fine Building Segmentation in High-Resolution
SAR Images via Selective Pyramid Dilated Network. IEEE journal
of selected topics in applied earth observations and remote sensing
14: 6608-6623. Web. (Year: 2021).*
(Continued)

*Primary Examiner* — William Kelleher
*Assistant Examiner* — Kenneth W Good
(74) *Attorney, Agent, or Firm* — NSIP Law

(57) ABSTRACT
An operating method of a radar sensor includes: performing
object classification on a detected target; comparing a con-
fidence score of a result of the object classification with a
threshold value; determining whether high-resolution infor-
mation on the detected target is to be generated based on a
result of the comparison; in response to a determination that
the high-resolution information is to be generated, selecting
one or more of a plurality of analog-to-digital converters
(ADCs) of the radar sensor, and determining control infor-
mation for changing a setting of the selected one or more
ADCs; changing the setting of the selected one or more
ADCs based on the determined control information; gener-
ating first intermediate frequency signals based on respec-
tive first reception signals and a frequency modulated signal,
the first reception signals being signals received through
reception antennas after a first transmission signal output by
the radar sensor is reflected by the detected target, and the
first transmission signal being generated based on the fre-
quency modulated signal; generating first radar data by
(Continued)

processing a portion of the generated first intermediate frequency signals through the selected one or more ADCs; generating second radar data by processing remaining signals among the generated first intermediate frequency signals through remaining ADCs of the plurality of ADCs; generating the high-resolution information on the detected target based on the generated first radar data; and generating high-resolution information on a predetermined range based on the generated second radar data.

25 Claims, 15 Drawing Sheets

(56) References Cited

U.S. PATENT DOCUMENTS

| | | | | |
|---|---|---|---|---|
| 10,168,414 | B2 * | 1/2019 | Chen | G01S 5/0218 |
| 11,362,743 | B1 * | 6/2022 | Williams | H04B 17/17 |
| 12,136,929 | B2 * | 11/2024 | Guan | H03M 1/0836 |
| 2011/0040818 | A1 * | 2/2011 | Fagg | H03H 19/004 |
| | | | | 708/313 |
| 2017/0367060 | A1 * | 12/2017 | Reinhardt | H04W 24/02 |
| 2018/0059232 | A1 | 3/2018 | Park et al. | |
| 2019/0041842 | A1 * | 2/2019 | Cella | G01M 13/045 |
| 2019/0257941 | A1 | 8/2019 | Duque Biarge et al. | |
| 2020/0072957 | A1 | 3/2020 | Choi | |
| 2020/0091608 | A1 * | 3/2020 | Alpman | H01Q 1/243 |
| 2020/0137351 | A1 * | 4/2020 | Bai | H04N 7/12 |
| 2020/0300970 | A1 * | 9/2020 | Nguyen | G01S 13/88 |
| 2020/0379093 | A1 | 12/2020 | Mendel et al. | |
| 2021/0011151 | A1 * | 1/2021 | Longman | G01S 7/352 |
| 2021/0248395 | A1 | 8/2021 | Yamada et al. | |
| 2022/0026557 | A1 * | 1/2022 | Arbabian | G01S 13/726 |
| 2022/0045740 | A1 * | 2/2022 | Huang | H04B 7/0617 |
| 2022/0390265 | A1 * | 12/2022 | Welle | G01F 23/284 |

OTHER PUBLICATIONS

Will, Christoph et al. Human Target Detection, Tracking, and Classification Using 24-GHz FMCW Radar. IEEE Sensors Journal 19.17: 7283-7299. Web. (Year: 2019).*

* cited by examiner

APPARATUS AND METHOD WITH RADAR

CROSS-REFERENCE TO RELATED APPLICATIONS

This application claims the benefit under 35 USC § 119(a) of Korean Patent Application No. 10-2022-0026857, filed on Mar. 2, 2022 with the Korean Intellectual Property Office, the entire disclosure of which is incorporated herein by reference for all purposes.

BACKGROUND

1. Field

The following description relates to an apparatus and method with radar.

2. Description of Related Art

Advanced driver-assistance systems (ADAS) may support driving to improve a driver's safety and convenience and to help a driver avoid dangerous situations by using sensors mounted inside or outside vehicles.

Sensors used in ADAS may include, for example, a camera, an infrared sensor, an ultrasonic sensor, a LiDAR, and/or a radar. Among these sensors, a radar may be relatively less affected by a surrounding environment, such as weather, and may be configured to more stably measure an object in the vicinity of a vehicle, when compared to optical-based sensors.

SUMMARY

This Summary is provided to introduce a selection of concepts in a simplified form that are further described below in the Detailed Description. This Summary is not intended to identify key features or essential features of the claimed subject matter, and is not intended to be used as an aid in determining the scope of the claimed subject matter.

In one general aspect, an operating method of a radar sensor includes: performing object classification on a detected target; comparing a confidence score of a result of the object classification with a threshold value; determining whether high-resolution information on the detected target is to be generated based on a result of the comparison; in response to a determination that the high-resolution information is to be generated, selecting one or more of a plurality of analog-to-digital converters (ADCs) of the radar sensor, and determining control information for changing a setting of the selected one or more ADCs; changing the setting of the selected one or more ADCs based on the determined control information; generating first intermediate frequency signals based on respective first reception signals and a frequency modulated signal, the first reception signals being signals received through reception antennas after a first transmission signal output by the radar sensor is reflected by the detected target, and the first transmission signal being generated based on the frequency modulated signal; generating first radar data by processing a portion of the generated first intermediate frequency signals through the selected one or more ADCs; generating second radar data by processing remaining signals among the generated first intermediate frequency signals through remaining ADCs of the plurality of ADCs; generating the high-resolution information on the detected target based on the generated first radar data; and generating high-resolution information on a predetermined range based on the generated second radar data.

The determining of the control information may include: determining a shift value for frequency-shifting an input signal of the selected one or more ADCs based on a distance between the detected target and the radar sensor; and determining a decimation factor of the selected one or more ADCs to be greater than a decimation factor of each of the remaining ADCs.

The changing of the setting may include: changing a frequency of a numerically controlled oscillator (NCO) of the selected one or more ADCs using the determined shift value; and changing the decimation factor of the selected one or more ADCs to the determined decimation factor, and a frequency and a decimation factor of an NCO of each of the remaining ADCs are maintained.

The generating of the first radar data may include: performing oversampling on a portion of the generated first intermediate frequency signals to generate first sample data; mixing a signal having the changed frequency and the generated first sample data to generate a first shifted data in which the generated first sample data is frequency-shifted; performing filtering on the generated first shifted data; and generating the first radar data by performing decimation on the filtered first shifted data based on the changed decimation factor.

THE generating of the second radar data may include: performing oversampling on the remaining signals among the generated first intermediate frequency signals to generate second sample data; mixing a signal of which a frequency is maintained and the generated second sample data to generate second shifted data in which the generated second sample data is frequency-shifted; performing filtering on the generated second shifted data; and generating the second radar data by performing decimation on the filtered second shifted data based on the maintained decimation factor.

The determining of whether the high-resolution information is to be generated may include determining that the high-resolution information on the detected target is to be generated in response to the confidence score being less than the threshold value.

The operating method may include: in response to another target being further detected along with the target, performing object classification on the detected other target, comparing a confidence score of a result of the object classification of the detected other target with the threshold value to determine whether high-resolution information on the detected other target is to be generated; in response to a determination that the high-resolution information on each of the detected target and the detected other target is to be generated, selecting a first ADC for generating the high-resolution information on the detected target and a second ADC for generating the high-resolution information on the detected other target, from among the ADCs; determining first control information for changing a setting of the selected first ADC and a setting of the selected second ADC; changing the setting of each of the selected first ADC and the selected second ADC based on the determined first control information; processing second reception signals through a circuit comprising the ADCs, the second reception signals being signals received through reception antennas after a second transmission signal output by the radar sensor is reflected by the target and the other target, and the second transmission signal being a signal generated based on the frequency modulated signal; and generating high-resolution information on the detected target, high-resolution information on the detected other target, and high-resolution information on the predetermined range, based on a result of the processing of the second reception signals through the circuit.

The determining of the first control information may include: determining a shift value for frequency-shifting an input signal of the selected first ADC based on a distance between the detected target and the radar sensor; determining a shift value for frequency-shifting an input signal of the selected second ADC based on a distance between the detected other target and the radar sensor; and determining a decimation factor of the selected first ADC and a decimation factor of the selected second ADC based on a confidence score of a result of the object classification of the detected target and a confidence score of a result of the object classification of the detected other target, respectively.

The processing through the circuit may include: generating second intermediate frequency signals based on each of the second reception signals, and the frequency modulated signal; generating third radar data by processing a portion of the generated second intermediate frequency signals through the selected first ADC; generating fourth radar data by processing another portion of the generated second intermediate frequency signals through the selected second ADC; and generating fifth radar data by processing remaining signals among the generated second intermediate frequency signals through remaining ADCs.

The generating of the high-resolution information on the detected target, the high-resolution information on the detected other target, and the high-resolution information on the predetermined range, based on the result processed by the circuit may include: generating the high-resolution information on the detected target based on generated third radar data; generating the high-resolution information on the detected other target based on generated fourth radar data; and generating high-resolution information on the predetermined range based on generated fifth radar data.

The operating method may include: controlling the ADCs such that frequencies of an NCO of each of the ADCs are different from each other; processing third reception signals through a circuit comprising the controlled ADCs, the third reception signals being signals received through the reception antennas after a third transmission signal output by the radar sensor is reflected by one or more targets, and the third transmission signal being generated based on the frequency modulated signal; generating high-resolution information for each range based on a processing result of each of the third reception signals; and generating high-resolution information on a detectable range of the radar sensor by concatenating the generated high-resolution information for the each range.

The high-resolution information on the detected target may include either one or both of a distance and an angle to the detected target.

In another general aspect, a radar sensor includes: a plurality of antennas; a first circuit electrically connected to the antennas and comprising a plurality of analog-to-digital converters (ADCs); and one or more processors configured to: perform object classification on a detected target; compare a confidence score of a result of the object classification with a threshold value; determine whether high-resolution information on the detected target is to be generated based on a result of the comparison; and in response to a determination that the high-resolution information is to be generated, select one or more of the ADCs, determine control information for changing a setting of the selected one or more ADCs, and transmit the determined control information to the first circuit, wherein the first circuit is configured to: change the setting of the selected one or more ADCs based on the determined control information; generate first intermediate frequency signals based on respective first reception signals and a frequency modulated signal; and generate first radar data by processing a portion of the generated first intermediate frequency signals through the selected one or more ADCs, generate second radar data by processing remaining signals among the generated first intermediate frequency signals through remaining ADCs of the ADCs, and transmit the generated first radar data and the generated second radar data to the one or more processors, wherein the one or more processors are configured to generate the high-resolution information on the detected target based on the generated first radar data, and generate high-resolution information on a predetermined range based on the generated second radar data, and wherein first reception signals are signals received through reception antennas after a first transmission signal output by a transmission antenna is reflected by the target, and the first transmission signal is generated based on the frequency modulated signal.

For the determining of the control information, the one or more processors may be configured to: determine a shift value for frequency-shifting an input signal of the selected one or more ADCs based on a distance between the detected target and the radar sensor; and determine a decimation factor of the selected one or more ADCs to be greater than a decimation factor of each of the remaining ADCs.

For the changing of the setting, the first circuit may be configured to change a frequency of a numerically controlled oscillator (NCO) of the selected one or more ADCs using the determined shift value, and change the decimation factor of the selected one or more ADCs to the determined decimation factor, and a frequency and a decimation factor of an NCO of each of the remaining ADCs are maintained.

For the determining of whether the high-resolution information is to be generated, the one or more processors may be configured to determine that the high-resolution information on the detected target is to be generated in response to the confidence score being less than the threshold value.

The one or more processors may be configured to: in response to another target being further detected along with the target, perform object classification on the detected other target, compare a confidence score of a result of the object classification of the detected other target with a threshold value to determine whether high-resolution information on the detected other target is to be generated; in response to a determination that the high-resolution information on each of the detected target and the detected other target is to be generated, select a first ADC for generating the high-resolution information on the detected target and a second ADC for generating the high-resolution information on the detected other target, from among the ADCs; determine first control information for changing a setting of the selected first ADC and a setting of the selected second ADC; and transmit the determined first control information to the first circuit, and the first circuit may be configured to change the setting of each of the selected first ADC and the selected second ADC based on the determined first control information, process second reception signals, and transmit a processing result of the second reception signals to the one or more processors, and the second reception signals may be signals received through the reception antennas after a second transmission signal output by the transmission antenna is reflected by the target and the other target, and the second transmission signal is generated based on the frequency modulated signal.

For the determining of the first control information, the one or more processors may be configured to: determine a shift value for frequency-shifting an input signal of the selected first ADC based on a distance between the detected target and the radar sensor, determine a shift value for frequency-shifting an input signal of the selected second ADC based on a distance between the detected other target and the radar sensor, and determine a decimation factor of the selected first ADC and a decimation factor of the selected second ADC based on a confidence score of a result of the object classification of the detected target and a confidence score of a result of the object classification of the detected other target, respectively.

The first circuit may be configured to control the ADCs so that frequencies of an NCO of each of the ADCs are different from each other, process third reception signals using the controlled ADCs, and transmit processing results of each of the third reception signals to the one or more processors, and the one or more processors may be configured to generate high-resolution information for each range based on the processing results of each of the third reception signals, and generate high-resolution information on a detectable range of the radar sensor by concatenating the generated high-resolution information for the each range, and the third reception signals may be signals received through the reception antennas after a third transmission signal output by the transmission antenna is reflected by one or more targets, and the third transmission signal is generated based on the frequency modulated signal.

The radar sensor may be included in advanced driver assistance systems (ADAS).

A signal processing system may include the radar sensor.

In another general aspect, an operating method of a radar sensor includes: performing object classification on a detected target; in response to a confidence score of a result of the object classification being less than a threshold value, determining control information for changing a setting of one or more of a plurality of analog-to-digital converters (ADCs) of the radar sensor; generating high-resolution information on the detected target based on first radar data, the first radar data being generated based on a portion of intermediate frequency signals using the one or more ADCs of which the setting is changed based on the determined control information; and generating high-resolution information on a predetermined range based on second radar data, the second radar data being generated based on remaining signals of the intermediate frequency signals using remaining ADCs of the plurality of ADCs.

The setting of the one or more ADCs may be different than a setting of the remaining ADCs used to generate the second radar data.

The one or more of the ADCs may include a first ADC and a second ADC, and the determining of the control information may include determining a decimation factor of the second ADC to be greater than a decimation factor of the first ADC, in response to the confidence score of a result of object classification of a second detected target being greater than the confidence score of the result of the object classification of the detected target.

The intermediate frequency signals may be generated based on respective reception signals and a frequency modulated signal, the reception signals may be received through reception antennas of the radar sensor after a transmission signal output by the radar sensor is reflected by the detected target, and the transmission signal may be generated based on the frequency modulated signal.

Other features and aspects will be apparent from the following detailed description, the drawings, and the claims.

Figure 1:
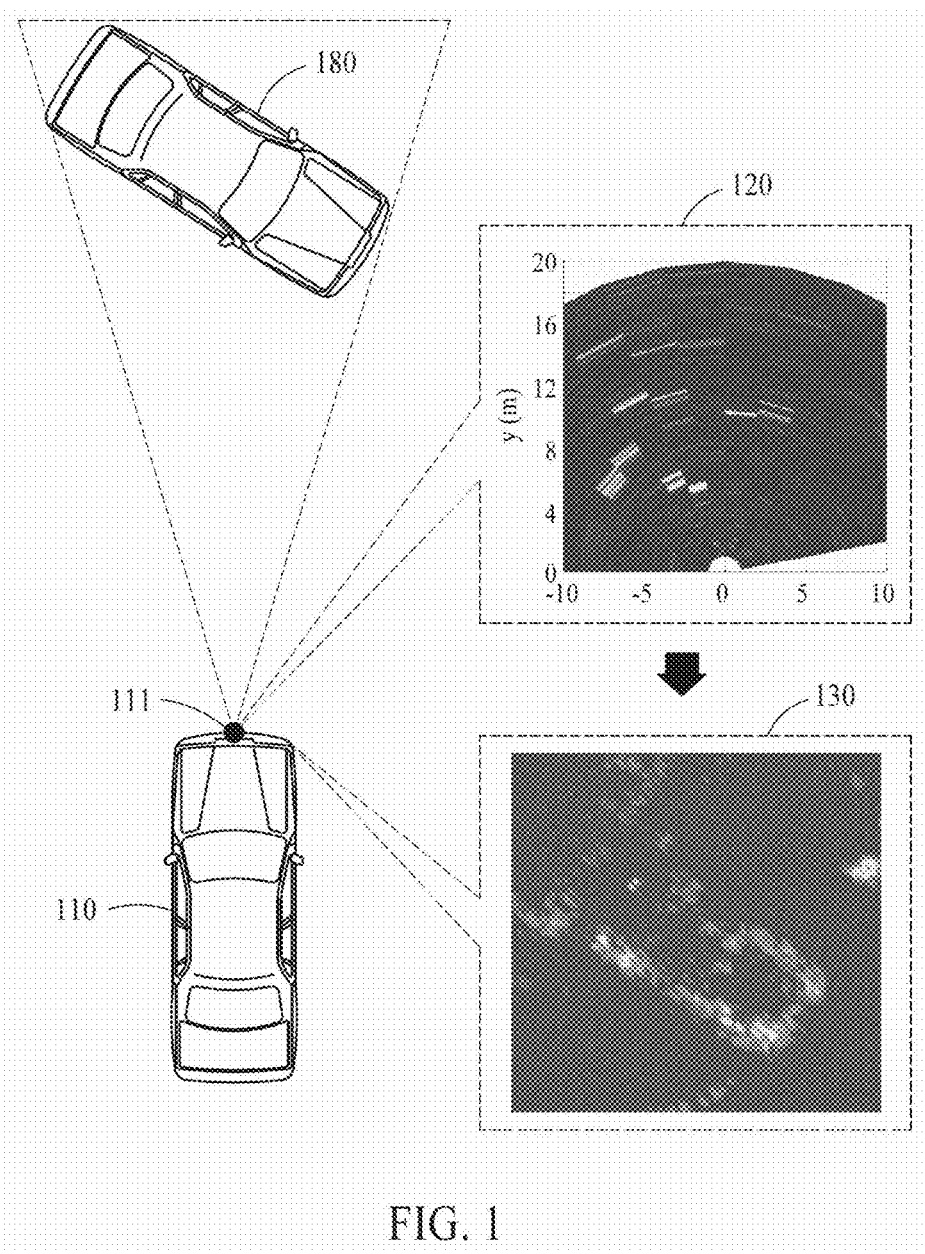
FIG. 1 illustrates an example of an operation of a radar sensor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms, such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," "coupled to," or "accessed to" another component, it may be directly "connected to," "coupled to," or "accessed to" the other component, or there may be one or more other components intervening therebetween. In contrast, when an element is described as being "directly connected to," "directly coupled to," or "directly accessed to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like components and a repeated description related thereto will be omitted.

FIG. 1 illustrates an example of an operation of a radar sensor.

Referring to FIG. 1, a radar sensor 111 may detect information (e.g., range, velocity, direction, and the like) on a target 180 ahead by analyzing a radar signal. The radar sensor 111 may be positioned inside a main body of a radar signal processing system 110 (e.g., a signal processing device) or outside the main body of signal processing system 110, and the signal processing system 110 may detect the information on the target 180 ahead based on both a radar signal received from the radar sensor 111 and data collected by another sensor (e.g., an image sensor, etc.). Resolving power in radar data processing may be divided into resolving power performance in terms of hardware and resolving power performance in terms of software. In an example, the radar sensor 111 may be included in the signal processing system 110.

In an example, the resolving power may be the power of a device to discriminate a very small difference, for example, smallest unit discriminative power, and it may be expressed as "resolving power=(discriminable smallest scale unit)/(total operation range)". The smaller the resolving power value of the device, the more precise results the device may output. The resolving power value may also be referred to as the resolving power unit. For example, if the device has a small resolving power value, the device may discriminate a relatively small unit and thus, the device may output results with increased resolution and improved precision. When the device has a great resolving power value, the device may not be able or configured to discriminate a small unit and thus, output results with reduced resolution and reduced precision.

The signal processing system 110 may be mounted on and/or included in a vehicle as shown in FIG. 1. In an example, the signal processing system 110 may be the vehicle. The vehicle may perform adaptive cruise control (ACC), autonomous emergency braking (AEB), blind spot detection (BSD), lane change assistance (LCA), and other similar operations based on the range to the target 180 detected by the signal processing system 110.

Furthermore, the signal processing system 110 may generate a surrounding map 130 in addition to detecting the range. The surrounding map 130 may refer to a map that represents positions of various targets present around the signal processing system 110, such as the target 180. A surrounding target may be a dynamic object, such as a vehicle and/or a person, and may be a static object that is present in a background, such as a guard rail and/or a traffic light.

To generate the surrounding map 130, a single scan image method may be used. In the single scan image method, the signal processing system 110 may obtain a single scan image 120 from the radar sensor 111 and generate the surrounding map 130 from the obtained single scan image 120. The single scan image 120 may be an image that is generated from a radar signal generated by a single radar sensor 111 and may represent ranges that are indicated by radar signals received from an arbitrary elevation angle with relatively high resolving power. For example, in the single scan image 120 of FIG. 1, a horizontal axis may denote a steering angle of the radar sensor 111 and a vertical axis may denote a range from the radar sensor 111 to the target 180. However, a form of the single scan image is not limited to an example illustrated in FIG. 1, and may be expressed in a different format depending on a design.

The steering angle may represent an angle corresponding to a target direction from the signal processing system 110 to the target 180. For example, the steering angle may represent an angle between a heading direction of the signal processing system 110 (or, a vehicle including the signal processing system 110) and a target direction. In an example, the steering angle is described mainly based on a horizontal angle, but is not limited thereto. For example, the steering angle may apply to the elevation angle.

The signal processing system 110 may obtain (e.g., determine) information about a shape of the target 180 through a multi-radar map (e.g., the surrounding map 130). The multi-radar map may be generated from a combination of a plurality of radar scan images. For example, the signal processing system 110 may generate the surrounding map 130 by spatial-temporally combining radar scan images obtained according to a movement of the radar sensor 111. The surrounding map 130 may be a kind of a radar image map and may be used for pilot parking.

The signal processing system 110 may use direction of arrival (DOA) information to generate the surrounding map 130. The DOA information may be information indicating the direction in which a radar signal reflected from a target is received. The signal processing system 110 may identify the direction in which the target exists relative to the radar sensor 111 using the DOA information described above. Therefore, such DOA information may be used to generate radar scan data and surrounding maps.

Radar information (such as, e.g., a range, velocity, DOA, and/or map information on the target 180 generated by the signal processing system 110) may be used to control the vehicle equipped with the signal processing system 110. For example, control of the vehicle may include velocity and steering control of the vehicle, such as ACC, AEB, BSD, and/or LCA. A control system of the vehicle may control the vehicle by directly or indirectly using the radar information.

Figure 2:
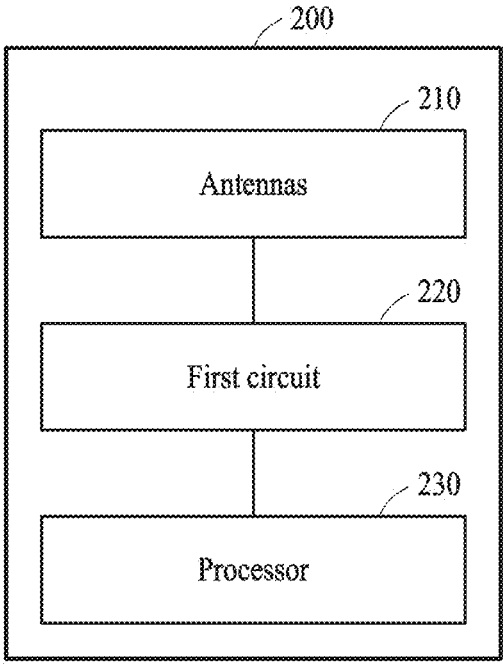
FIG. 2 is a block diagram illustrating an example of a radar sensor.

FIG. 2 is a block diagram illustrating an example of a radar sensor.

Referring to FIG. 2, a radar sensor 200 may include antennas 210, a first circuit 220, and a processor 230 (e.g., one or more processors). The radar sensor 200 may also be expressed as a radar device or an electronic device configured to process a radar signal. In a non-limiting example, the radar sensor 200 may be the radar sensor 111 of FIG. 1.

The first circuit 220 and the processor 230 may be implemented in separate chips. Alternatively, the first circuit 220 and the processor 230 may be implemented in a same single chip.

The radar sensor 200 may be, for example, an mmWave radar and may measure a range to a target by analyzing a change in a waveform of a radar signal and time of flight (ToF), which is a duration until a radiated electric wave returns after being reflected by the target. For reference, compared to an optic-based sensor including a camera, the mmWave radar may detect front regardless of a change in an external environment, such as fog and rain. In addition, since the mmWave radar has excellent cost performance compared to LiDAR, the mmWave radar may be one of sensors that may compensate for the aforementioned disadvantages of the camera. For example, the radar sensor 200 may be implemented as a frequency modulated continuous wave (FMCW) radar. The FMCW radar may be robust against external noise.

The radar sensor 200 may radiate a radar signal to the outside of the radar sensor 200 and receive a reflected signal, which is a radiated radar signal reflected by one or more targets. Here, the radiated radar signal may be referred to as a transmission signal, and the received reflected signal may be referred to as a reception signal. The transmission signal may be generated based on a frequency modulated signal (or a chirp signal) (e.g., an FMCW signal) of which a carrier frequency is modulated. A frequency of the transmission signal may vary within a predetermined band. For example, the frequency of the transmission signal may linearly vary within the predetermined band.

The antennas 210 may correspond to array antennas. Among the antennas 210, a transmission antenna may output or radiate a transmission signal, and reception antennas may receive reflected signals from which a transmission signal is reflected by a target. Multiple input multiple output (MIMO) may be implemented through the antennas 210. A plurality of MIMO channels may be formed by the antennas 210. For example, a plurality of channels corresponding to M×N virtual antennas may be formed through M transmission antennas and N reception antennas. Here, the reflected signals received through the respective channels may have different phases based on reception directions.

The first circuit 220 may generate intermediate frequency (IF) signals (e.g., beat frequency signals) based on the frequency modulated signal and the reception signals. The intermediate frequency may correspond to a difference between the frequency of the frequency modulated signal and the frequency of the reception signal.

The first circuit 220 may obtain (e.g., generate) radar data by processing the IF signals through a plurality of analog-to-digital converters (ADC)s. The first circuit 220 may transmit the obtained radar data to the processor 230.

The processor 230 may generate and use information on the target based on the received radar data. For example, the processor 230 may perform a range fast Fourier transform (FFT), Doppler FFT, constant false alarm rate (CFAR) detection, DOA estimation, and the like based on the radar data, and obtain the information on the target, such as range, velocity, and/or direction. The information on the target may be provided for various applications, such as ACC, AEB, BSD, and LCA.

Figure 3:
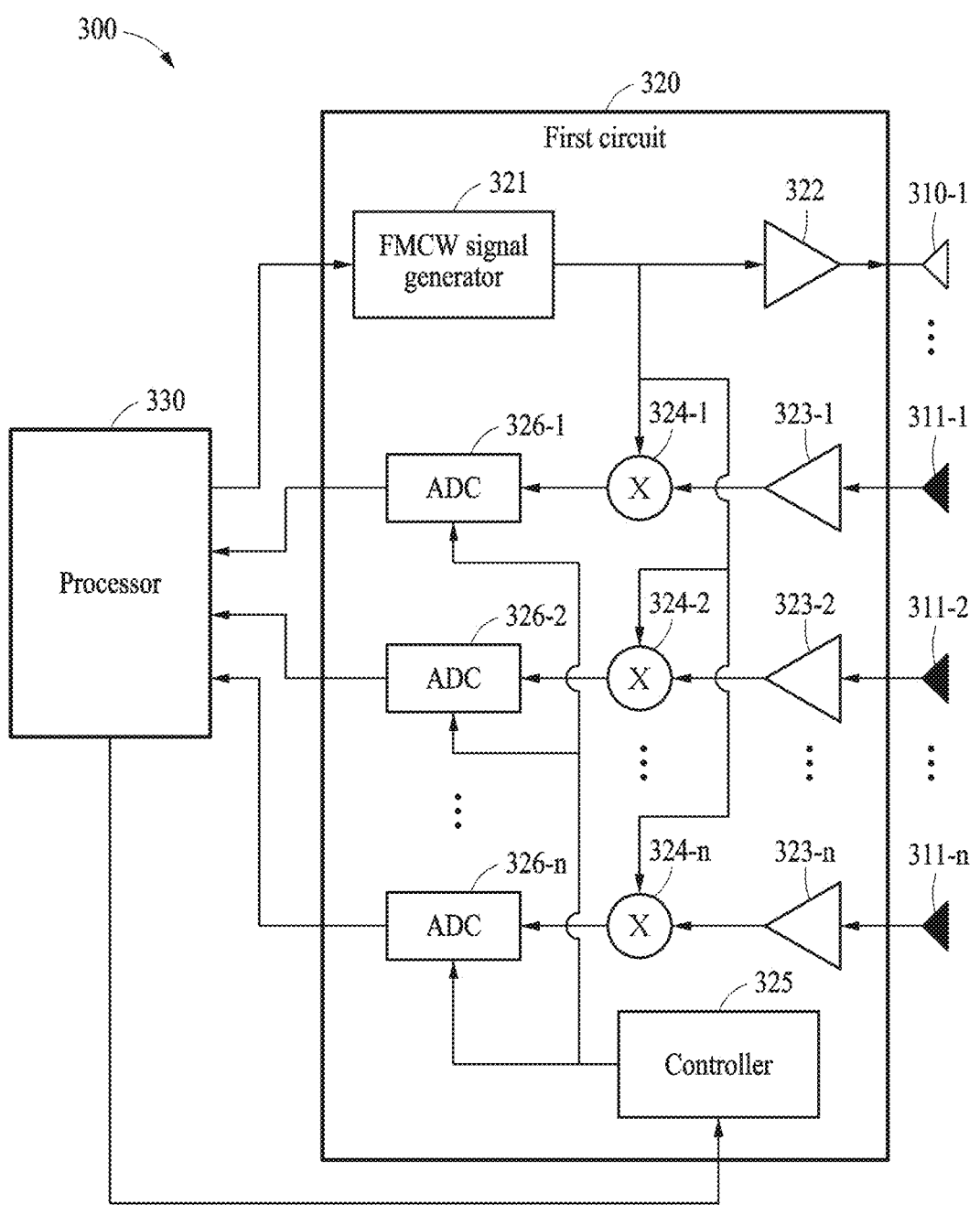
FIGS. 3 and 4 illustrate a configuration of an example of a radar sensor.
Figure 4:
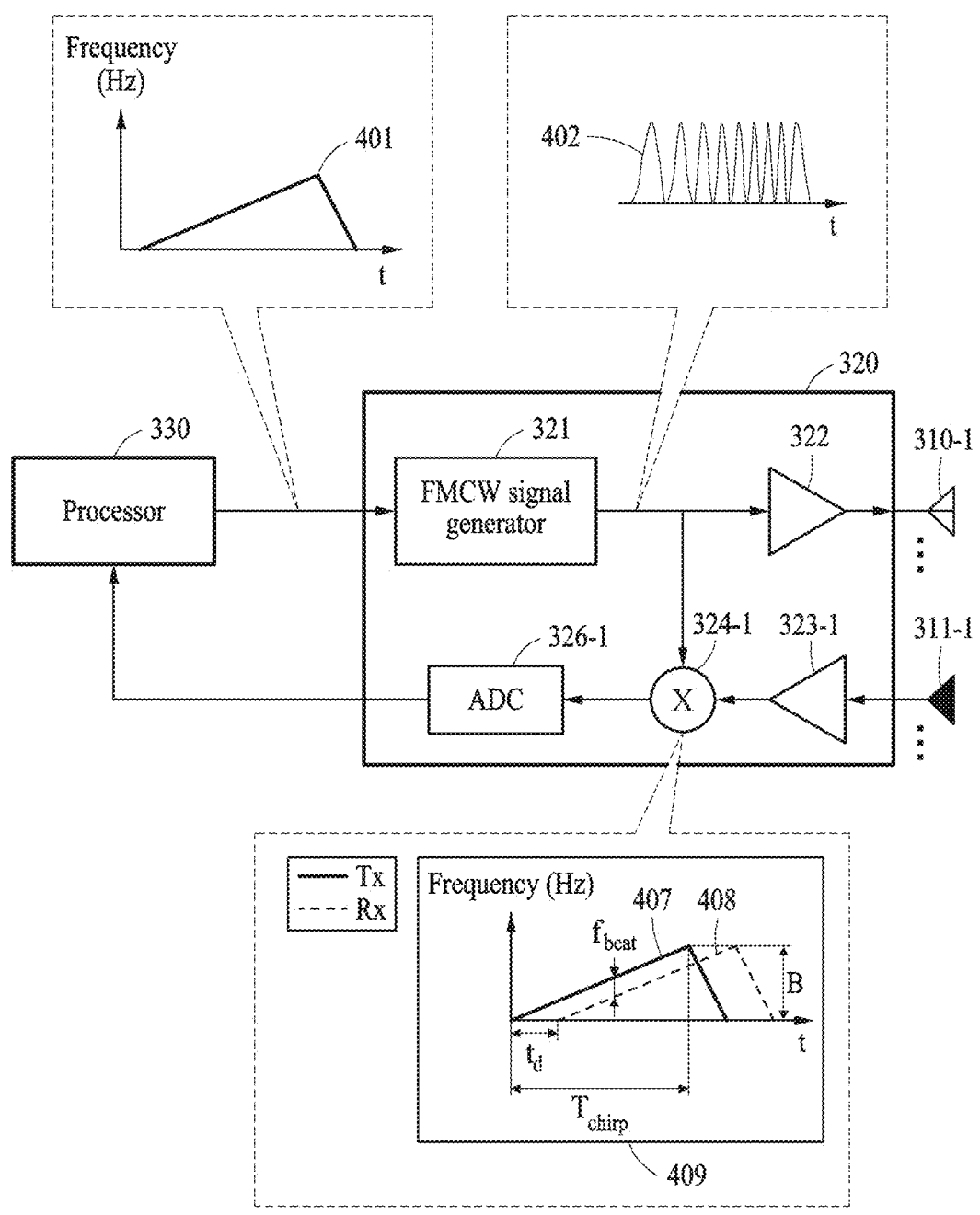

FIGS. 3 and 4 illustrate a configuration of an example of a radar sensor.

Referring to FIG. 3, a radar sensor 300 may include a plurality of antennas 310-1, 311-1 to 311-*n*, a first circuit 320, and a processor 330 (e.g., one or more processors).

The first circuit 320 and the processor 330 may be implemented in separate chips or implemented in a same single chip.

The first circuit 320 may also be a radio frequency integrated circuit (RFIC) and/or a radio frequency (RF) signal processing circuit, and the processor 330 may be a baseband processor and/or a radar signal processor.

The antenna 310-1 may correspond to a transmission antenna, and the antennas 311-1 to 311-*n* may correspond to reception antennas. Although one transmission antenna 310-1 is illustrated in FIG. 1, it is provided merely as an example, and the radar sensor 300 may include a plurality of transmission antennas (e.g., there may be one or more additional transmission antennas 310-2 to 310-*n*).

The first circuit 320 may include an FMCW signal generator 321, a power amplifier 322, a plurality of low noise amplifiers (LNAs) 323-1 to 323-*n*, a plurality of frequency mixers 324-1 to 324-*n*, a controller 325, and a plurality of ADCs 326-1 to 326-*n*.

The FMCW signal generator 321 may generate a frequency modulated signal (e.g., an FMCW signal 402 of FIG. 4), which is a signal in which a carrier frequency changes with time, based on setting information of the transmission signal. The setting information of the transmission signal may include, for example, setting information related to a detection area and/or detection resolution of the radar sensor 300. In an example, the FMCW signal generator 321 may include a voltage controlled oscillator (VCO) circuit for generating various carrier frequencies (or oscillation frequencies) and a phase locked loop (PLL) circuit for improving the stability of an output frequency of the VCO circuit.

The FMCW signal generator 321 may generate the FMCW signal 402 by modulating a carrier frequency according to a frequency modulation model (e.g., a frequency modulation model 401 of FIG. 4) defined (e.g., determined) by the processor 330. The frequency modulation model 401 may be a model indicating a change in a carrier frequency of a transmission signal to be transmitted through the radar sensor 300. In the frequency modulation model 401, a vertical axis may represent the magnitude of the carrier frequency, and a horizontal axis may represent time. The frequency modulation model 401 may have, for example, a pattern in which the carrier frequency changes linearly or non-linearly with time.

In an example of FIG. 4, the frequency modulation model 401 may have a pattern in which the carrier frequency linearly changes with time. The FMCW signal generator 321 may generate the FMCW signal 402 having a carrier frequency change pattern based on the frequency modulation model 401. For example, as shown in FIG. 4, the FMCW signal 402 may represent a waveform in which the carrier frequency gradually increases in some sections, and may represent a waveform in which the carrier frequency gradually decreases in other sections. In the graph in which the FMCW signal 402 is displayed, the vertical axis may represent the magnitude of the FMCW signal, and the horizontal axis may represent time.

The FMCW signal 402 generated by the FMCW signal generator 321 may be transmitted to the power amplifier 322. The power amplifier 322 may amplify the received FMCW signal 402 and transmit the amplified FMCW signal to the transmission antenna 310-1. The transmission antenna 310-1 may radiate the amplified FMCW signal as a transmission signal.

The reception antennas 311-1 to 311-$n$ may receive, as reception signals, reflected signals from which the radiated transmission signal is reflected by one or more targets.

Each of the plurality of LNAs 323-1 to 323-$n$ may amplify and output only a component of the reception signal in which noise is removed (or reduced) from each reception signal.

Each of the plurality of frequency mixers 324-1 to 324-$n$ may mix an output signal of a respective one of the plurality of LNAs 323-1 to 323-$n$ with the FMCW signal 402 to generate a respective one of the IF signals, and may transmit the generated IF signal to a respective one of the plurality of ADCs 326-1 to 326-$n$.

Each of the plurality of ADCs 326-1 to 326-$n$ may generate (or obtain) radar data by processing the respectively received IF signal, and may transmit the generated radar data to the processor 330.

In an example, the processor 330 may obtain information on the target from radar data. For example, the processor 330 may compare a frequency 408 of the reception signal received by the reception antenna 311-1 with a frequency 407 of the transmission signal transmitted by the transmission antenna 310-1 (or the FMCW signal 402). The processor 330 may detect a difference between the frequency 408 of the reception signal and the frequency 407 of the transmission signal. In graph 409, the frequency difference between the transmission signal and the reception signal may represent a predetermined difference $f_{beat}$ during an interval in which the carrier frequency increases with time in the frequency modulation model 401, and $f_{beat}$ may be proportional to a range between the radar sensor 300 and the target. The range between the radar sensor 300 and the target may be derived from the frequency difference f beat between the transmission signal and the reception signal. For example, the processor 330 may calculate (e.g., determine) the range between the radar sensor 300 and the target based on Equation 1 below, for example.

$$R = \frac{c \times T_{chirp} \times f_{beat}}{2 \times B} \qquad \text{Equation 1}$$

In Equation 1, R denotes the range between the radar sensor 300 and the target, c denotes the speed of light, $T_{chirp}$ denotes a time length of a rising interval of the carrier frequency in the frequency modulation model 401, $f_{beat}$ denotes a frequency difference between a transmission signal and a reflected signal at any point in the rising interval (and may correspond to a beat frequency or an intermediate frequency), and B denotes a bandwidth. $f_{beat}$ may be derived through Equation 2 below, for example.

$$f_{beat} = \frac{t_d \times B}{T_{chirp}} \qquad \text{Equation 2}$$

In Equation 2, $t_d$ denotes a time difference (e.g., a delay time) between the time at which the transmission signal is radiated and the time at which the reception signal is received, and represents a round-trip delay time for the target.

In an example, the processor 330 may detect a target according to a low-resolution and long-range detection mode of the radar sensor 300. The processor 330 may perform object classification on the detected target, and may compare a confidence score of a result of the object classification with a threshold value. The processor 230 may determine whether high-resolution information on the detected target is to be generated based on a result of the comparison. When the processor 230 determines that the high-resolution information on the detected target is to be generated, the processor 230 may select one or more of the ADCs 326-1 to 326-$n$, and determine control information for changing a setting of the selected ADC, and transmit the determined control information to the first circuit 320. In a non-limiting example, the confidence score is a value between 0 and 1 representing the likelihood that the result of the object classification is correct.

The controller 325 in the first circuit 320 may change the setting of the selected ADC based on the received control information.

The first circuit 320 may receive first reception signals through the reception antennas 311-1 to 311-$n$, and may generate first IF signals based on each of the first reception signals and the FMCW signal 402, and may obtain (e.g., generate) first radar data by processing a portion of the generated first IF signals through the selected ADC (e.g., the selected ADC for which the setting is changed). The first circuit 320 may obtain second radar data by processing the remaining signals among the generated first IF signals through the remaining ADCs. The first circuit 320 may transmit the obtained first and second radar data to the processor 330.

The processor 330 may obtain the high-resolution information on the detected target based on the received first radar data, and may obtain high-resolution information on a predetermined range (e.g., a short range) based on the received second radar data. The high-resolution information on the detected target may include information with increased range resolution. Hereinafter, it may be understood that the high-resolution information on the detected target may include information with increased range resolution and angle resolution, the range resolution may be the smallest unit to discriminate distance information on the detected target, and the angle resolution may be the smallest unit to discriminate DOA information on the detected target.

Figure 5:
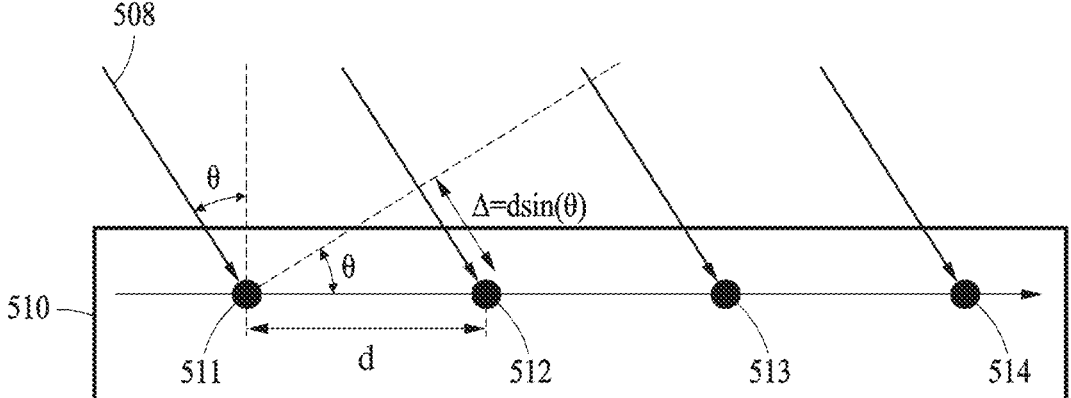
FIG. 5 illustrates an example of reception antennas of a radar sensor.

FIG. 5 illustrates an example of reception antennas of a radar sensor.

Referring to FIG. 5, antennas 510 may include a plurality of reception antennas 511 to 514. A plurality of channels (e.g., reception channels) may be formed through the plurality of reception antennas 511 to 514. Although not shown in FIG. 5, the antennas 510 may further include one or more transmission antennas.

When the implementation of radar sensors 200 and 300 uses a plurality of channels, phase information in radar data may be a phase difference between a reference phase and a phase of a signal received through each channel. The reference phase may be a predetermined phase, or may be set to a phase of one of the plurality of channels. For example, for a reception antenna, the radar sensors 200 and 300 may set a phase of a reception antenna element adjacent to the reception antenna to the reference phase.

In addition, processors 230 and 330 may generate a radar vector of a dimension corresponding to the number of channels of the radar sensors 200 and 300 from the radar data. For example, when the radar sensor includes 7 channels, the processors 230 and 330 may generate a seven-dimensional radar vector including a phase value corresponding to each channel. The phase value corresponding to each channel may be a numerical value representing the phase difference described above.

For example, when the radar sensors 200 and 300 include one transmission channel and four reception channels, a transmission signal radiated through the transmission channel may be reflected by a target, and the reflected signals may be received through the four channels. As shown in FIG. 5, the phase of the reflected signal received from the reception antenna 511 may be set as the reference phase. When a reception signal 508 reflected from the same target is received by the antennas 510, an additional distance A between a range from the target to the reception antenna 511 and a range from the target to the reception antenna 512 may be expressed by Equation 3 below, for example.

$$\Delta = d \times \sin(\theta) \qquad \text{Equation 3}$$

In Equation 3, $\theta$ may denote a DOA at which the reflected signal 508 is received, d may denote an interval (e.g., distance) between the reception antennas 511 to 514 elements, and c denoting the speed of light in the air is treated as a constant. Since $c=f\lambda$, a phase shift W at the reception antenna 512 due to the additional distance A may be derived by Equation 4 below, for example.

$$W = \frac{2\pi}{\lambda} d \times \sin(\theta) \qquad \text{Equation 4}$$

The phase shift W may correspond to a phase difference between a waveform of a signal received by the reception antenna 512 and a waveform of a signal received by the reception antenna 511. In Equation 4, $\lambda$ may denote a wavelength of the reception signal 508. $\lambda$ may be inversely proportional to a frequency f of the reception signal 508. When a carrier frequency change by a frequency modulation model 401 is small, the frequency f in Equation 4 may be regarded as a single initial frequency (e.g., f0) in the frequency modulation model 401. Therefore, when only the phase shift W is determined based on the received reflected signal, the processors 230 and 330 may determine that the DOA is $\theta$.

Figure 6A:
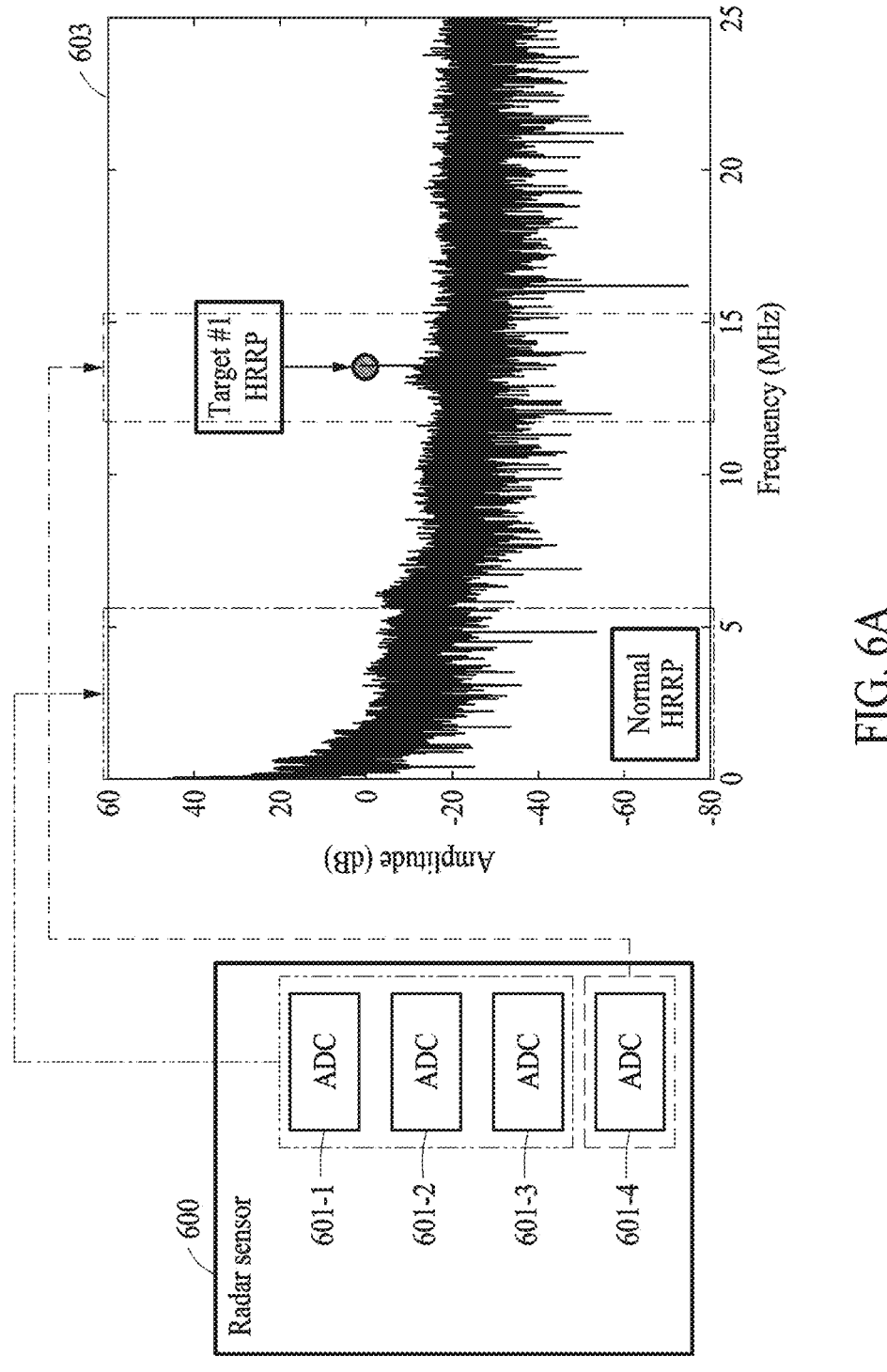
FIGS. 6A to 6C illustrate an example of a process in which a radar sensor obtains high-resolution distance information with respect to a detected target.
Figure 6B:
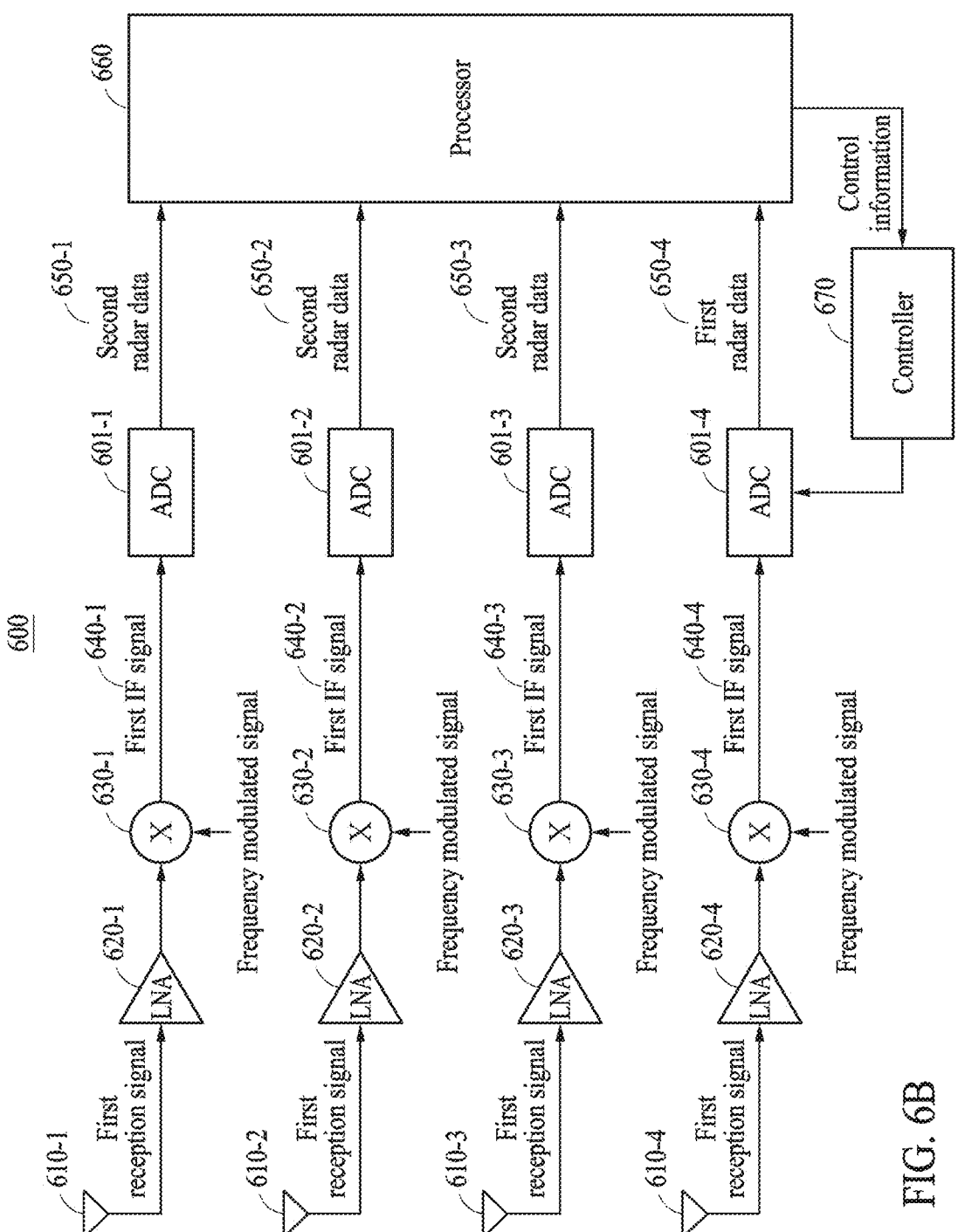
Figure 6C:
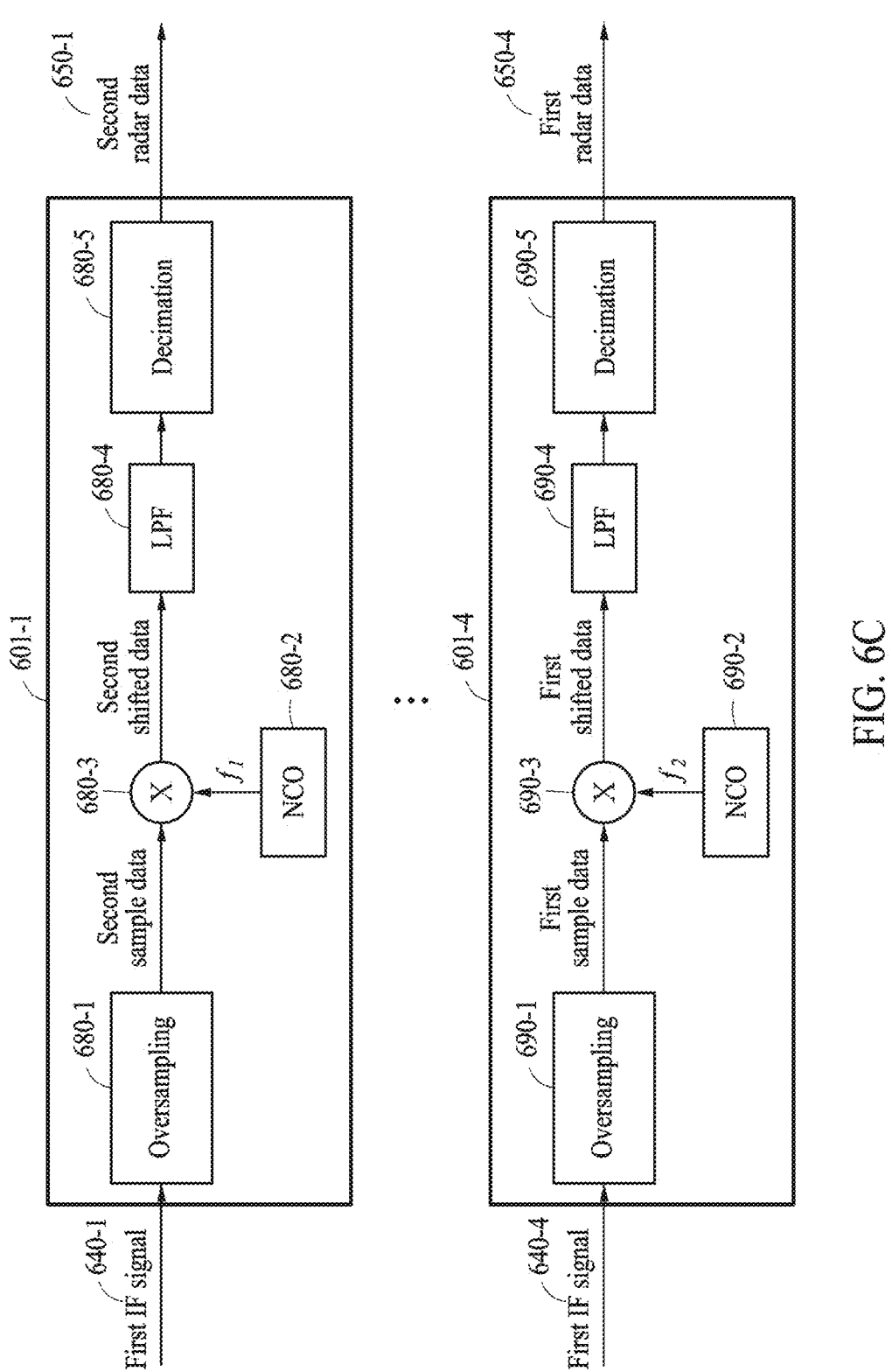

FIGS. 6A to 6C illustrate an example of a process in which a radar sensor obtains high-resolution distance information with respect to a detected target.

FIGS. 6A and 6B illustrate an example 600 of the radar sensors 200 and 300.

Referring to FIGS. 6A and 6B, a radar sensor 600 may include a plurality of reception antennas 610-1 to 610-4, a plurality of LNAs 620-1 to 620-4, a plurality of frequency mixers 630-1 to 630-4, a plurality of ADCs 601-1 to 601-4, a processor 660 (e.g., one or more processors), and a controller 670. The plurality of LNAs 620-1 to 620-4, the plurality of frequency mixers 630-1 to 630-4, the plurality of ADCs 601-1 to 601-4, and the controller 670 may correspond to the respective components of the first circuits 220 and 320.

In an example of FIG. 6A, the radar sensor 600 may operate in a low-resolution and long-range detection mode. The radar sensor 600 may operate in the low-resolution and long-range detection mode as an initial mode to prevent a vehicle collision. For example, the radar sensor 600 may operate in the low-resolution and long-range detection mode by setting a bandwidth (e.g., the bandwidth B described with reference to FIG. 3) of a frequency modulated signal to a narrowband (e.g., 200 MHz, 500 MHz).

Graph 603 of FIG. 6A relates to a low-resolution and long-range detection mode of the radar sensor 600, and outputs of the ADCs 601-1 to 601-3 which may indicate a short-range and high-resolution mode and an output of the ADC 601-4 which may indicate a range between the radar sensor 600 and a target #1 and a high-resolution mode, which will be described below.

In the low-resolution and long-range detection mode, the processor 660 may detect the target #1 based on a result of an FFT of the outputs (or radar data collected in the low-resolution and long-range detection mode) of the ADCs 601-1 to 601-4, and may calculate the range between the radar sensor 600 and the detected target #1. The processor 660 may perform object classification on the detected target #1, and may compare a confidence score of a result of the object classification with a threshold value. When the confidence score of the result of the object classification is less than the threshold value, the processor 660 may determine that high-resolution information on the detected target #1 is to be generated. When the confidence score of the result of the object classification is greater than or equal to the threshold value, the processor 660 may determine that the high-resolution information on the detected target #1 is not to be generated.

When it is determined that the high-resolution information on the detected target #1 is to be generated, the processor 660 may select one or more of the ADCs 601-1 to 601-4, and receive or determine control information for changing a setting of the selected one or more ADCs. The processor 660 may designate the remaining ADCs (e.g., excluding the selected one or more ADCs) as ADCs for obtaining high-resolution information on a short range.

In an example of FIG. 6A, the processor 660 may select the ADC 601-4 from among the ADCs 601-1 to 601-4 to obtain high-resolution information on the detected target #1, and the processor 660 may designate the remaining ADCs 601-1 to 601-3 as ADCs for obtaining high-resolution information on a short range.

In another example, the processor 660 may change the bandwidth of a frequency modulated signal from a narrowband (e.g., 200 MHz, 500 MHz) to a wideband (e.g., 2 GHz, 4 GHz) so as to obtain high-resolution information on the detected target #1 and high-resolution information on a short range.

The processor 660 may determine (or calculate) a numerically controlled oscillator (NCO) shift of the selected ADC 601-4 based on a range between the radar sensor 600 and the detected target #1. In other words, the processor 660 may determine a shift value for frequency-shifting an input signal of the ADC 601-4. The NCO shift may be a frequency of the NCO (or a frequency of an output signal of the NCO). The NCO shift of the ADC 601-4 may be greater than the NCO shift of each of the remaining ADCs 601-1 to 601-3. Each of the remaining ADCs 601-1 to 601-3 may have the same NCO shift.

As the range between the radar sensor 600 and the detected target #1 increases, the determined NCO shift may increase.

The processor 660 may determine a decimation factor of the selected ADC 601-4 to be greater than a decimation factor of each of the remaining ADCs 601-1 to 601-3. Each of the remaining ADCs 601-1 to 601-3 may have the same decimation factor. For example, when the decimation factor of each of the ADCs 601-1 to 601-3 is M, the processor 660 may determine the decimation factor of the ADC 601-4 to be 2M.

The processor 660 may transmit control information including the NCO shift and the decimation factor of the ADC 601-4 to the controller 670.

In an example of FIG. 6B, the controller 670 may change a setting (e.g., the NCO shift and the decimation factor) of the ADC 601-4 based on the received control information. For example, when the NCO shift is $f_2$, the controller 670 may change the frequency of the NCO of the ADC 601-4 to $f_2$, and may change the decimation factor to 2M. In the example of FIG. 6B, the frequency of the NCO of each of the remaining ADCs 601-1 to 601-3 may be $f_1$, and the decimation factor of each of the remaining ADCs 601-1 to 601-3 may be M.

The radar sensor 600 may amplify a frequency modulated signal and radiate (or output) the frequency modulated signal as a transmission signal (hereinafter, a "first transmission signal"), and reflected signals from which the first transmission signal is reflected by the target #1 may be received through the reception antennas 610-1 to 610-4. In the description of the example of FIG. 6B, the reflected signals received through the reception antennas 610-1 to 610-4 are referred to as "first reception signals".

Each of the first reception signals may be input to a respective one of the LNAs 620-1 to 620-4, and an output of each of the LNAs 620-1 to 620-4 may be input to a respective one of the frequency mixers 630-1 to 630-4.

Each of the frequency mixers 630-1 to 630-4 may mix the output of the respective one of the LNAs 620-1 to 620-4 with a frequency modulated signal to generate a respective one of first IF signals 640-1 to 640-4. Each of the first IF signals 640-1 to 640-4 may be input to a respective one of the ADCs 601-1 to 601-4.

Each of the ADCs 601-1 to 601-4 may process a respective one of the first IF signals 640-1 to 640-4. In an example of FIG. 6C, the ADC 601-1 may perform oversampling 680-1 on the first IF signal 640-1 to generate (or obtain) second sample data, and mix the second sample data with an output signal of an NCO 680-2 through a frequency mixer 680-3 to generate (or obtain) second shifted data in which the second sample data is frequency shifted. In this example, the output signal of the NCO 680-2 may have a frequency $f_1$. Accordingly, the second sample data may be shifted by the frequency $f_1$, such that a baseband second shifted data may be generated. The ADC 601-1 may perform low-pass filtering (LPF) 680-4 on the second shifted data, and perform decimation 680-5 on the filtered second shifted data to generate second radar data 650-1. In this example, a decimation factor of the ADC 601-1 (e.g., of the decimation 680-5) may be M. In another example, the second sample data and the output signal of the NCO 680-2 may be mixed to generate baseband in-phase/quadrature-phase (I/O) data.

The settings (e.g., the output signal of the NCO and the decimation factor) of the ADC 601-2 and the ADC 601-3 may be the same as the setting of the ADC 601-1, such that the ADC 601-2 and the ADC 601-3 may operate in the same manner as the ADC 601-1 described above with reference to FIG. 6C. In other words, the ADC 601-2 and the ADC 601-3 may perform oversampling respectively on the first IF signal 640-2 and the first IF signal 640-3 to generate respective second sample data, and mix the respectively generated second sample data with an output signal of an NCO having a frequency $f_1$ to generate respective second shifted data. Each of the ADC 601-2 and the ADC 601-3 may perform LPF on each generated second shifted data, and may perform decimation on each filtered second shifted data based on the decimation factor M to generate second radar data 650-2 and second radar data 650-3, respectively.

In an example of FIG. 6C, the ADC 601-4 may perform oversampling 690-1 on the first IF signal 640-4 to generate (or obtain) first sample data, and mix the first sample data with an output signal of an NCO 690-2 through a frequency mixer 690-3 to generate (or obtain) first shifted data in which the first sample data is frequency shifted. In this example, the output signal of the NCO 690-2 may have a frequency $f_2$. Accordingly, the first sample data may be shifted by the frequency $f_2$, such that a baseband first shifted data may be generated. The frequency $f_2$ may be greater than the frequency $f_1$. The ADC 601-4 may perform LPF 690-4 on the first shifted data, and perform decimation 690-5 on the filtered first shifted data based on a decimation factor 2M to generate first radar data 650-4. In another example, the first sample data and the output signal of the NCO 690-2 may be mixed to generate baseband I/O data.

In the example of FIG. 6C, the mixing of the ADC 601-1 through the frequency mixer 680-3, the LPF 680-4, and the decimation 680-5 may correspond to digital down-converting (DDC) of the ADC 601-1. The mixing of the ADC 601-4 through the frequency mixer 690-3, the LPF 690-4, and the decimation 690-5 may correspond to DDC of the ADC 601-4.

Referring back to FIG. 6B, the second radar data 650-1, 650-2, and 650-3 generated respectively through the ADCs 601-1, 601-2, and 601-3 and the first radar data 650-4 generated through the ADC 601-4 may be transmitted to the processor 660.

The first radar data 650-4 and the second radar data 650-1, 650-2, and 650-3 may have a higher resolution than radar data collected through the low-resolution and long-range detection mode.

The processor 660 may obtain high-resolution information on the detected target #1 based on the first radar data 650-4. The high-resolution information on the detected target #1 may include, for example, distance information in which a distance resolution between the detected target #1 and the radar sensor 600 is increased. For example, the processor 660 may perform an FFT on the first radar data 650-4, and may obtain distance information with an increased distance resolution of the target #1, based on a result of the FFT. The processor 660 may obtain high-resolution information on a short range based on the second radar data 650-1, 650-2, and 650-3. The high-resolution information on the short range may include, for example, distance information in which a distance resolution is increased within the short range.

The processor 660 may perform advanced radar signal processing (RSP) (e.g., object classification, environment recognition, etc.) based on the first radar data 650-4 and the second radar data 650-1, 650-2, and 650-3 (or the obtained high-resolution information). In addition, the processor 660 may perform various applications such as vehicle control and autonomous driving based on the results of the object classification and environment recognition.

In an example, the radar sensor 600 of one or mor embodiments may set the setting of the ADC 601-4 to be different from the settings of the remaining ADCs 601-1 to 601-3, to simultaneously obtain a high-resolution range profile (HRRP) for a short range (e.g., using the remaining ADCs 601-1 to 601-3) and for an object (e.g., target #1) at a predetermined distance (e.g., using the ADC 601-4). In addition, the radar sensor 600 of one or mor embodiments may obtain distance information on the object at the predetermined distance with a high resolution and reduced data amount.

The description provided with reference to FIGS. 1 to 5 may also apply to FIGS. 6A to 6C, and thus, a detailed description thereof is omitted.

Figure 7A:
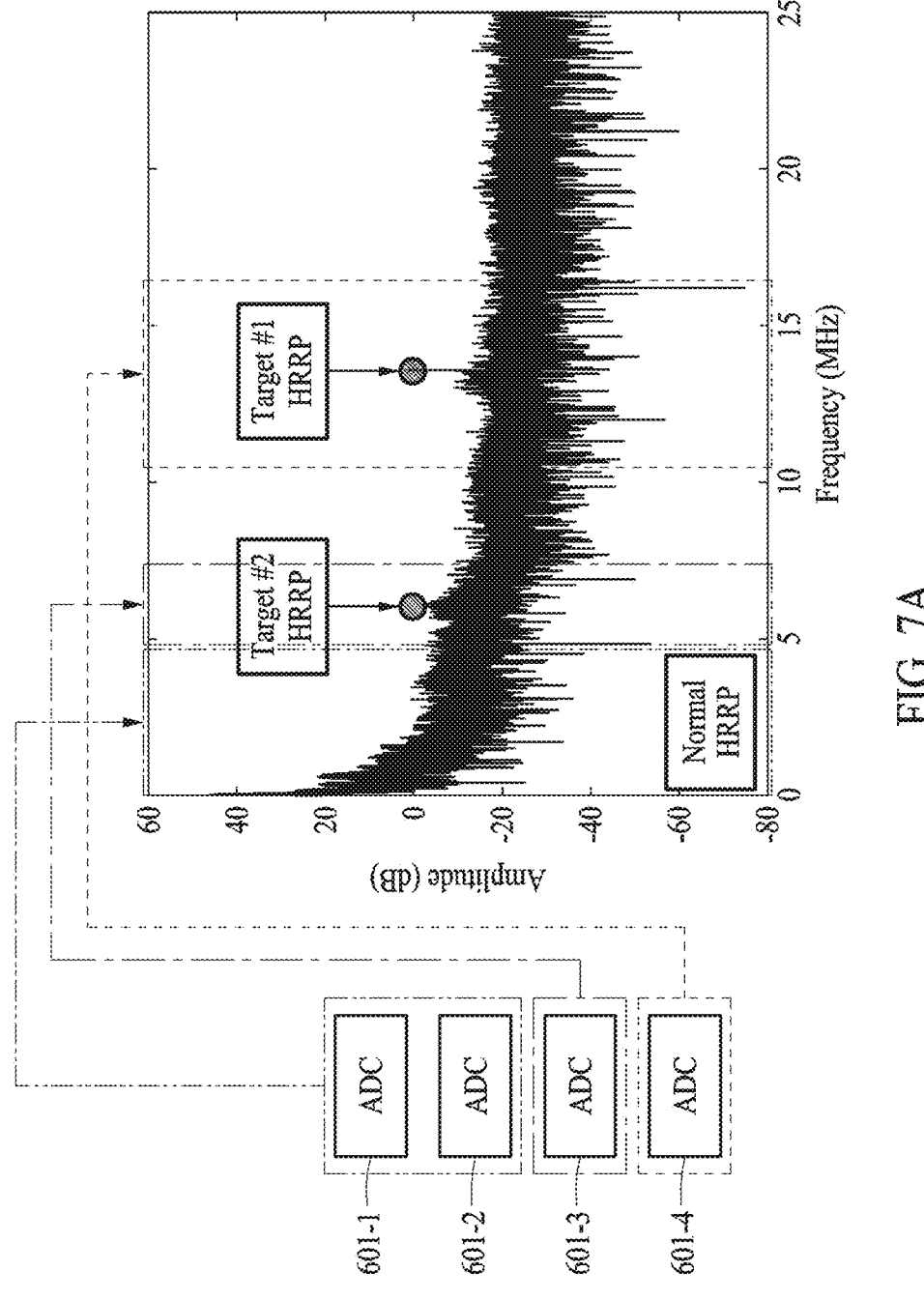
FIGS. 7A and 7B illustrate an example of a process in which a radar sensor obtains high-resolution distance information with respect to each of a plurality of detected targets.
Figure 7B:
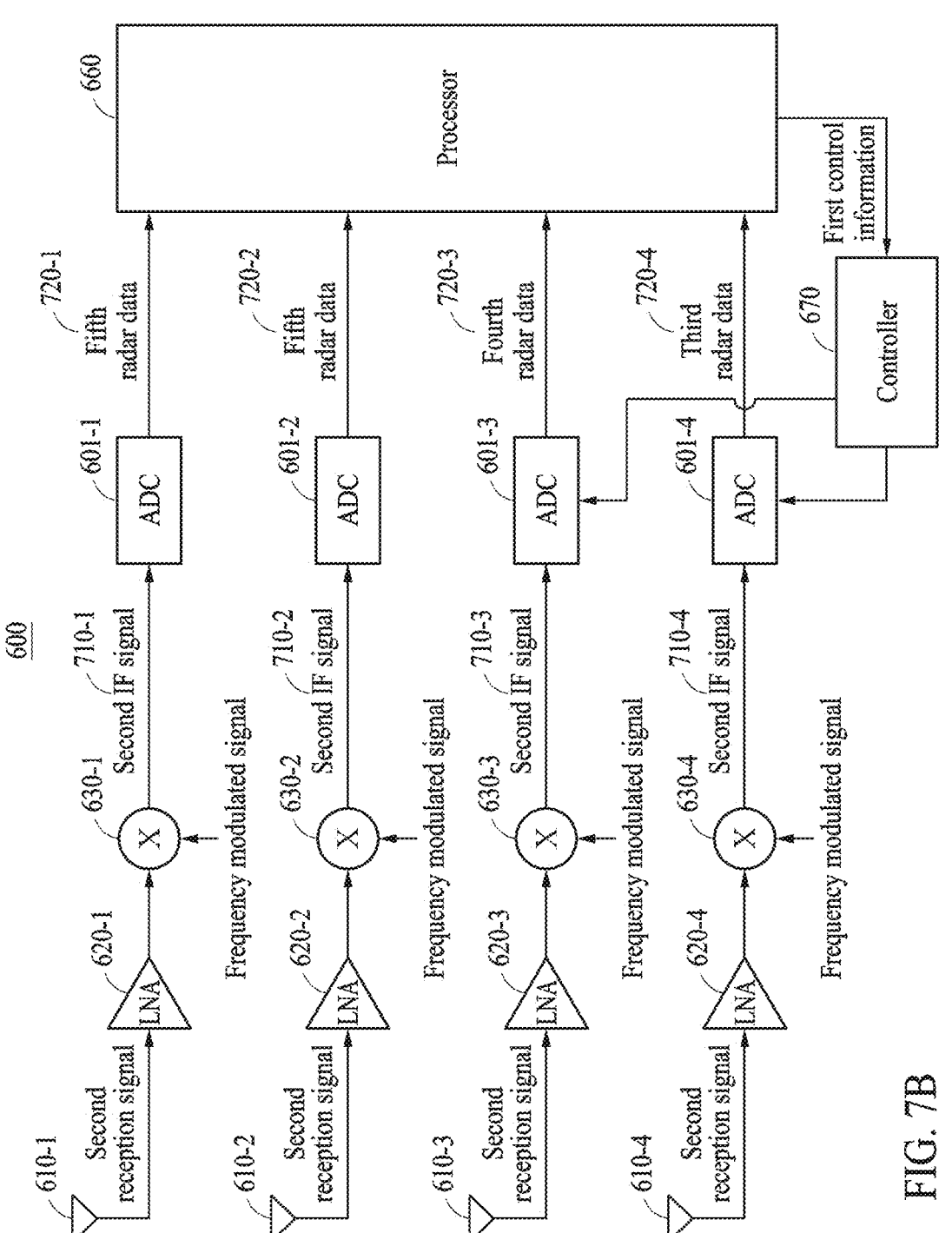

FIGS. 7A and 7B illustrate an example of a process in which a radar sensor obtains high-resolution distance information with respect to each of a plurality of detected targets.

In an example of FIGS. 7A and 7B, the radar sensor 600 may detect a plurality of targets in a low-resolution and long-range detection mode. In this example, the radar sensor 600 may simultaneously obtain high-resolution information on each of the detected targets and high-resolution information on a short range. Hereinafter, the example is described in detail with reference to FIGS. 7A and 7B.

In the example of FIG. 7A, the processor 660 may detect a plurality of targets (targets #1 and #2) based on a result of an FFT of radar data (or outputs of the ADCs 601-1 to 601-4 when operated in the low-resolution and long-range detection mode) collected in the low-resolution and long-range detection mode, and may calculate a range between each of the detected targets and the radar sensor 600.

The processor 660 may perform object classification on each of the detected targets #1 and #2 based on the radar data collected in the low-resolution and long-range detection mode, and may compare a confidence score of a result of the object classification with a threshold value of each of the detected targets #1 and #2. When the confidence score of the result of the object classification for each of the detected targets #1 and #2 is less than the threshold value, the processor 660 may determine that high-resolution information on each of the detected targets #1 and #2 is to be generated. Depending on the implementation, the confidence score of the result of the object classification of any one of the detected targets #1 and #2 (e.g., the detected target #1) may be greater than the threshold value, and the confidence score of the result of the object classification of the other of the detected targets #1 and #2 (e.g., the detected target #2) may be less than the threshold value. In this case, the radar sensor 600 may determine that high-resolution information on the detected target #2 is to be generated, and perform the operation described with reference to FIGS. 6A to 6C to obtain the high-resolution information on the detected target #2.

When the processor 660 determines that high-resolution information on each of the detected targets #1 and #2 is to be generated, the processor 660 may select one or more ADC for obtaining the high-resolution information on the detected target #1 and one or more ADC for obtaining the high-resolution information on the detected target #2, from among the ADCs 601-1 to 601-4. The processor 660 may designate the remaining ADCs that are not selected as ADCs for obtaining high-resolution information for a short range.

In the example of FIG. 7A, the processor 660 may select the ADC 601-4 from among the ADCs 601-1 to 601-4 to obtain the high-resolution information on the detected target

1. The processor 660 may select the ADC 601-3 from among the ADCs 601-1 to 601-3 to obtain the high-resolution information on the detected target #2. In FIGS. 7A and 7B, the selected ADC 601-4 is expressed as a first ADC, and the selected ADC 601-3 is expressed as a second ADC. The processor 660 may designate the remaining ADCs 601-1 and 601-2 as ADCs for obtaining high-resolution information on a short range.

The processor 660 may determine first control information for changing a setting of each of the first ADC 601-4 and the second ADC 601-3. The first control information may include, for example, either one or both of an NCO shift and a decimation factor of the first ADC 601-4, and either one or both of an NCO shift and a decimation factor of the second ADC 601-3.

In an example, the processor 660 may determine (or calculate) the NCO shift of the first ADC 601-4 based on a range between the radar sensor 600 and the detected target #1, and may determine (or calculate) the NCO shift of the second ADC 601-3 based on a range between the radar sensor 600 and the detected target #2. When the range between the radar sensor 600 and the detected target #1 is greater than the range between the radar sensor 600 and the detected target #2, the processor 660 may determine the NCO shift of the first ADC 601-4 to be greater than the NCO shift of the second ADC 601-3. The NCO shift of each of the first ADC 601-4 and the second ADC 601-3 may be greater than the NCO shift of each of the remaining ADCs 601-1 and 601-2. Each of the remaining ADCs 601-1 and 601-2 may have the same NCO shift.

In an example, the processor 660 may determine a decimation factor of each of the first ADC 601-4 and the second ADC 601-3 based on any one or any combination of any two or more of a signal-to-noise ratio (SNR) of reception signals, a cluster size, and a confidence score of a result of the object classification of the respective detected target #1 or #2. For example, the processor 660 may determine the decimation factor of the first ADC 601-4 and the second ADC 601-3 to be different when the confidence scores of the results of the object classification of the detected targets #1 and #2 are different. In an example, when the confidence score of the result of the object classification of the detected target #2 is greater than the confidence score of the result of the object classification of the detected target #1, the processor 660 may determine the decimation factor of the second ADC 601-3 to be greater than the decimation factor of the first ADC 601-4. In the example of FIG. 7A, the processor 660 may determine the decimation factor of the first ADC 601-4 to be A and may determine the decimation factor of the second ADC 601-3 to be 2A. Each of the remaining ADCs 601-1 and 601-2 may have the same decimation factor. In the example of FIG. 7A, the decimation factor of each of the remaining ADCs 601-1 and 601-2 may be A. In the example of FIG. 7A, the decimation factor of each of the remaining ADCs 601-1 and 601-2 may be the same as the decimation factor of the first ADC 601-4, but this is merely an example, and the decimation factor of the first ADC 601-4 may be different from the decimation factor of each of the remaining ADCs 601-1 and 601-2. For example, the decimation factor of each of the remaining ADCs 601-1 and 601-2 may be the same and less than A.

In the example of FIG. 7B, the processor 660 may transmit the first control information including the NCO shift and/or the decimation factor of each of the first ADC 601-4 and the second ADC 601-3 to the controller 670.

The controller 670 may change a setting (e.g., an NCO shift and/or a decimation factor) of the first ADC 601-4 based on the received first control information, and change a setting (e.g., an NCO shift and/or a decimation factor) of the second ADC 601-3 based on the received first control information.

The radar sensor 600 may amplify a frequency modulated signal and radiate (or output) the frequency modulated signal as a transmission signal (hereinafter, a "second transmission signal"), and reflected signals from which the second transmission signal is reflected by the target #1 and the target #2 may be received through the reception antennas 610-1 to 610-4. In the description of the example of FIG. 7B, the reflected signals received through the reception antennas 610-1 to 610-4 are referred to as "second reception signals".

Each of the second reception signals may be input to a respective one of the LNAs 620-1 to 620-4, and an output of each of the LNAs 620-1 to 620-4 may be input to a respective one of the frequency mixers 630-1 to 630-4.

Each of the frequency mixers 630-1 to 630-4 may mix the output of a respective one of the LNAs 620-1 to 620-4 with a frequency modulated signal to generate a respective one of second IF signals 710-1 to 710-4. Each of the second IF signals 710-1 to 710-4 may be input to a respective one of the ADCs 601-1 to 601-4.

Each of the ADCs 601-1 to 601-4 may process a respective one of the second IF signals 710-1 to 710-4. In the example of FIG. 7B, the ADC 601-1 and the ADC 601-2 may process (e.g., perform oversampling and DDC on) the second IF signal 710-1 and the second IF signal 710-2, respectively, to respectively generate (or obtain) fifth radar data 720-1 and 720-2. The second ADC 601-3 may process (e.g., perform oversampling and DDC on) the second IF signal 710-3 to generate (or obtain) fourth radar data 720-3, and the first ADC 601-4 may process (e.g., perform oversampling and DDC on) the second IF signal 710-4 to generate (or obtain) third radar data 720-4. The description of the operations of the ADCs 601-1 to 601-4 of FIGS. 6B and 6C may be applied to the operations of the ADCs 601-1 to 601-4 of FIG. 7B, and thus, a detailed description thereof is omitted.

The processor 660 may receive the fifth radar data 720-1 and 720-2 from the ADCs 601-1 and 601-2, and receive the fourth radar data 720-3 from the second ADC 601-3, and receive the third radar data 720-4 from the first ADC 601-4.

The processor 660 may obtain high-resolution information on the detected target #1 based on the third radar data 720-4. The processor 660 may obtain high-resolution information on the detected target #2 based on the fourth radar data 720-3. The processor 660 may obtain high-resolution information on a short range based on the fifth radar data 720-1 and 720-2.

The processor 660 may perform object classification and environment recognition based on the radar data 720-1 to 720-4 (or the obtained high-resolution information). In addition, the processor 660 may perform various applications such as vehicle control and autonomous driving based on the radar data 720-1 to 720-4 (or the obtained high-resolution information).

In an example, the radar sensor 600 of one or more embodiments may set a setting of the first ADC 601-4, a setting of the second ADC 601-3, and settings of the remaining ADCs 601-1 and 601-2 to be different, to simultaneously obtain an HRRP of the detected target #1, an HRRP of the detected target #2, and an HRRP of a short range. In addition, the radar sensor 600 of one or more embodiments may obtain distance information on each of several objects with a high resolution and reduced data amount for each channel.

The description provided with reference to FIGS. 1 to 6C may also apply to FIGS. 7A and 7B, and thus, a detailed description thereof is omitted.

Figure 8A:
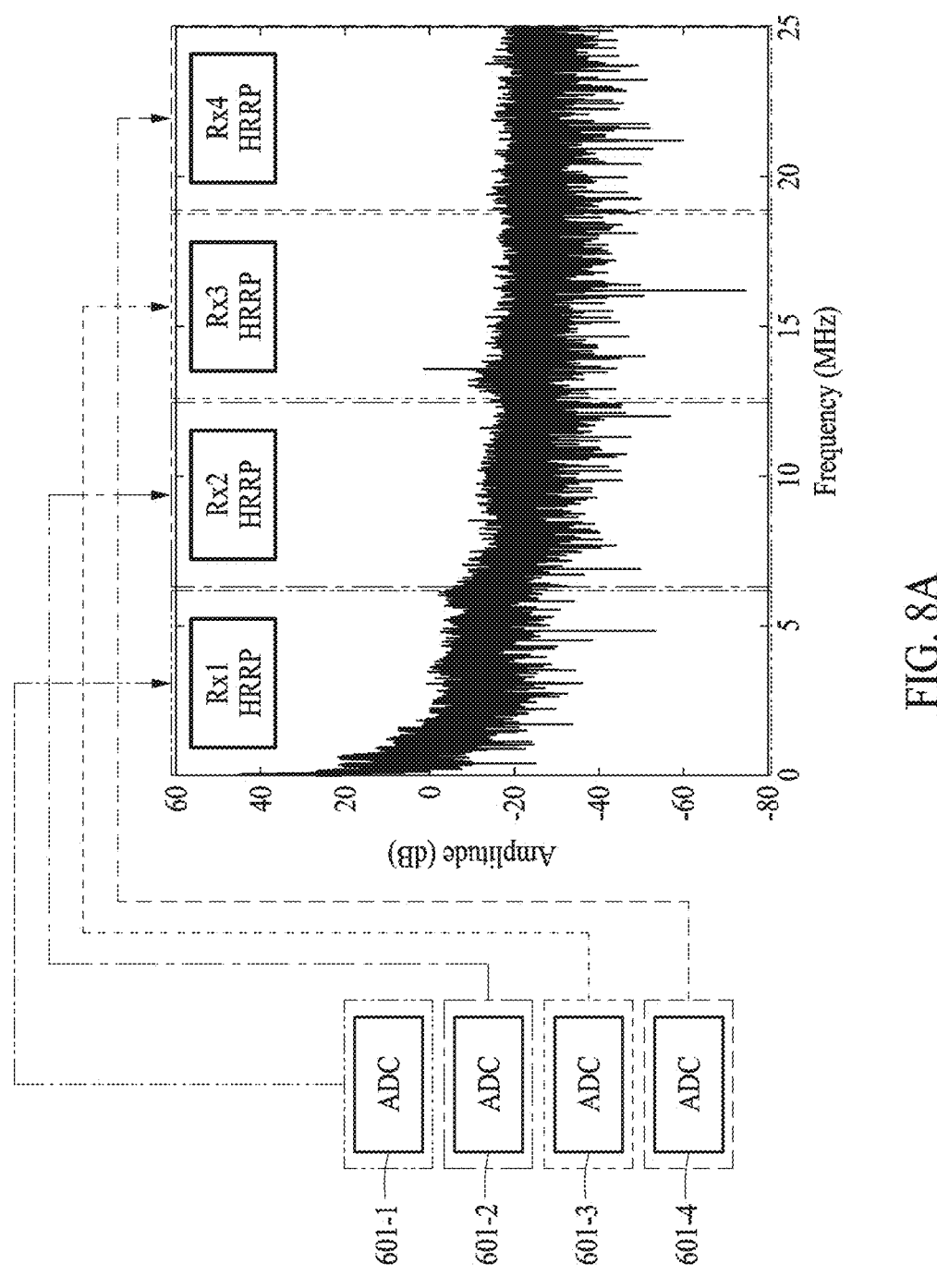
FIGS. 8A and 8B illustrate an example of a process in which a radar sensor obtains high-resolution distance information using analog-to-digital converters (ADCs).
Figure 8B:
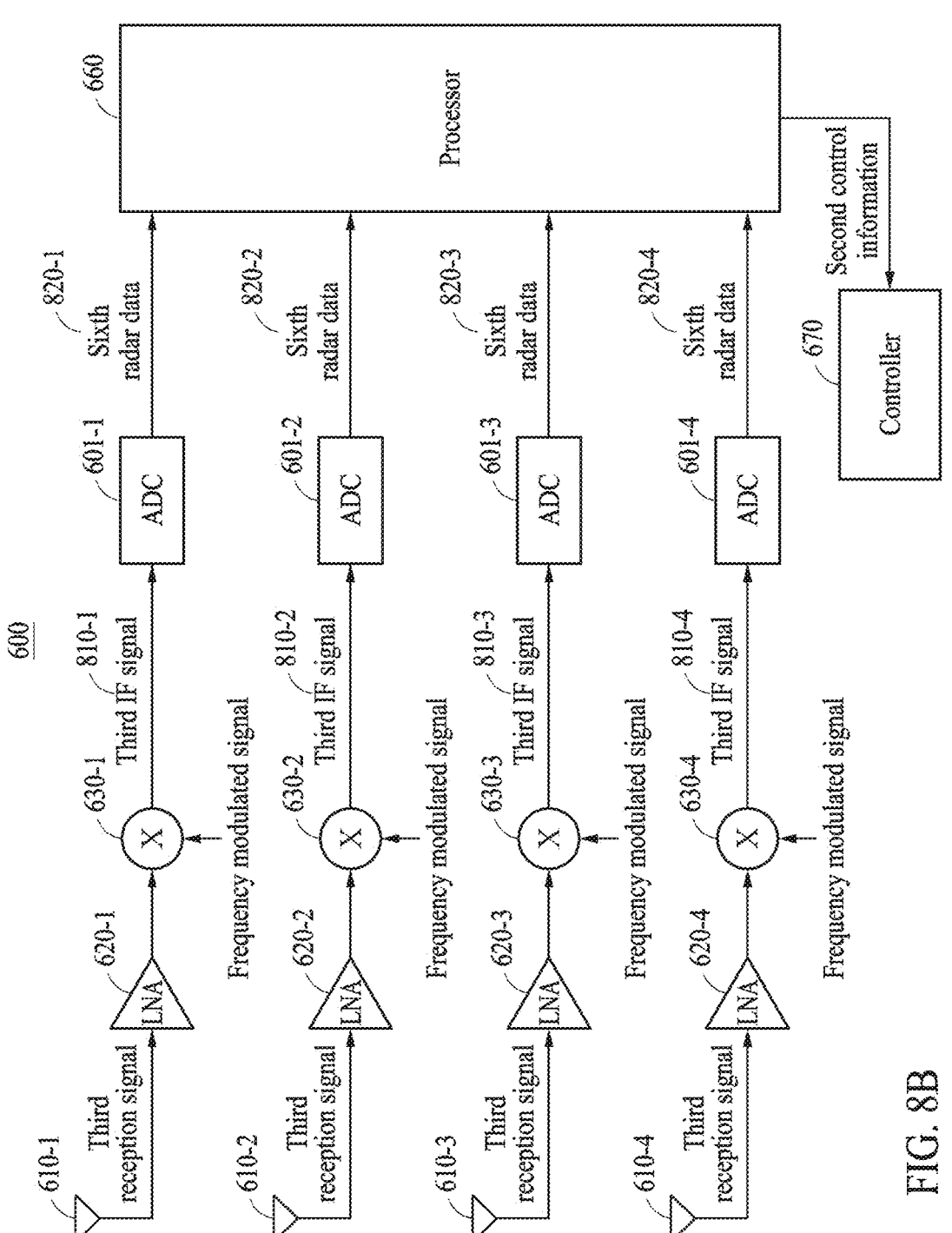

FIGS. 8A and 8B illustrate an example of a process in which a radar sensor obtains high-resolution distance information using ADCs.

In an example of FIGS. 8A and 8B, the radar sensor 600 may set different settings for each of the ADCs 601-1 to 601-4 to obtain high-resolution information on an entire detection area (or a detectable area). Hereinafter, the example is described in detail with reference to FIGS. 8A and 8B.

In the example of FIG. 8A, the processor 660 may identify or determine a first frequency domain to a fourth frequency domain from a result of an FFT of radar data collected in a low-resolution and long-range detection mode. The first frequency domain may be, for example, 0 to 6.25 MHz in the graph of FIG. 8A, the second frequency domain may be, for example, 6.25 MHz to 12.5 MHz in the graph of FIG. 8A, the third frequency domain may be, for example, 12.5 MHz to 18.75 MHz in the graph of FIG. 8A, and the fourth frequency domain may be, for example, 18.75 MHZ to 25 MHz in the graph of FIG. 8A. A width of each frequency domain may be 6.25 MHz.

The processor 660 may determine the ADC 601-1 to be an ADC for obtaining high-resolution information on a first range (e.g., the first frequency domain or a range corresponding to the first frequency domain), and determine the ADC 601-2 to be an ADC for obtaining high-resolution information on a second range (e.g., the second frequency domain or a range corresponding to the second frequency domain). The processor 660 may determine the ADC 601-3 to be an ADC for obtaining high-resolution information for a third range (e.g., the third frequency domain or a range corresponding to the third frequency domain), and determine the ADC 601-4 to be an ADC for obtaining high-resolution information on a fourth range (e.g., the fourth frequency domain or a range corresponding to the fourth frequency domain).

The processor 660 may determine different settings for each of the ADCs 601-1 to 601-4. For example, the processor 660 may determine a different NCO shift for each of the ADCs 601-1 to 601-4. In the example of FIG. 8A, the NCO shift of the ADC 601-1 may be the smallest and the NCO shift of the ADC 601-4 may be the greatest. In the example of FIG. 8A, the width of each of the first to fourth frequency domains may equal to 6.25 MHz, such that a decimation factor of each of the ADCs 601-1 to 601-4 may be equal to each other. Depending on the implementation, the width of each of the first to fourth frequency domains may be different, and the processor 660 may determine the decimation factor of each of the ADCs 601-1 to 601-4 differently. For example, the width of the first frequency domain may be the greatest and the width of the fourth frequency domain may be the smallest. In this example, the decimation factor of the ADC 601-1 may be the smallest and the decimation factor of the ADC 601-4 may be the greatest.

The processor 660 may determine second control information for changing a setting of each of the ADCs 601-1 to 601-4. The second control information may include, for example, an NCO shift and/or a decimation factor of each of the ADCs 601-1 to 601-4.

In the example of FIG. 8B, the processor 660 may transmit the second control information to the controller 670.

The controller 370 may change the setting of each of the ADCs 601-1 to 601-4 based on the received second control information. For example, when the NCO shift of each of the ADCs 601-1 to 601-4 is $f_a$, $f_b$, $f_c$, and $f_d$, respectively, the controller 370 may set (or change) the frequency of each of the ADCs 601-1 to 601-4 to $f_a$, $f_b$, $f_c$, and $f_d$, respectively. The frequency of an output signal of each of the ADCs 601-1 to 601-4 may be different from each other. The controller 370 may set each of the ADCs 601-1 to 601-4 to have the same decimation factor.

The radar sensor 600 may amplify a frequency modulated signal and radiate (or output) the frequency modulated signal as a transmission signal (hereinafter, a "third transmission signal"), and reflected signals from which the third transmission signal is reflected by one or more targets may be received through the reception antennas 610-1 to 610-4. In the description of the example of FIG. 8B, the reflected signals received through the reception antennas 610-1 to 610-4 are referred to as "third reception signals".

Each of the third reception signals may be input to a respective one of the LNAs 620-1 to 620-4, and an output of each of the LNAs 620-1 to 620-4 may be input to a respective one of the frequency mixers 630-1 to 630-4.

Each of the frequency mixers 630-1 to 630-4 may mix the output of a respective one of the LNAs 620-1 to 620-4 with a frequency modulated signal to generate a respective one of third IF signals 810-1 to 810-4. Each of the third IF signals 810-1 to 810-4 may be input to a respective one of the ADCs 601-1 to 601-4.

Each of the ADCs 601-1 to 601-4 may process a respective one of the third IF signals 810-1 to 810-4. In the example of FIG. 8B, each of the ADCs 601-1 to 601-4 may process (e.g., perform oversampling and DDC on) a respective one of the third IF signals 810-1 to 810-4 to generate respective sixth radar data 820-1 to 820-4. The DDC of each of the ADCs 601-1 to 601-4 may include a mixing of sample data of a respective one of the third IF signals 810-1 to 810-4 with output signals of the NCO of the respective one of the ADCs 601-1 to 601-4, while the frequency of the output signals of the NCO of the ADCs 601-1 to 601-4 may be different.

The processor 660 may receive the sixth radar data 820-1 to 820-4 respectively from the ADCs 601-1 to 601-4.

The processor 660 may obtain high-resolution information on each of the first to fourth ranges based on the sixth radar data 820-1 to 820-4. The processor 660 may obtain high-resolution information on an entire detection area (or a detectable area) of the radar sensor 600 by concatenating the obtained high-resolution information for each area.

In an example, the radar sensor 600 of one or more embodiments may perform the operation described with reference to FIGS. 8A and 8B to more accurately determine whether a target is detected. The radar sensor 600 of one or more embodiments may cooperatively collect high-resolution information of different ranges through a plurality of channels (or reception channels).

The description provided with reference to FIGS. 1 to 6C may also apply to FIGS. 8A and 8B, and thus, a detailed description thereof is omitted.

Figure 9A:
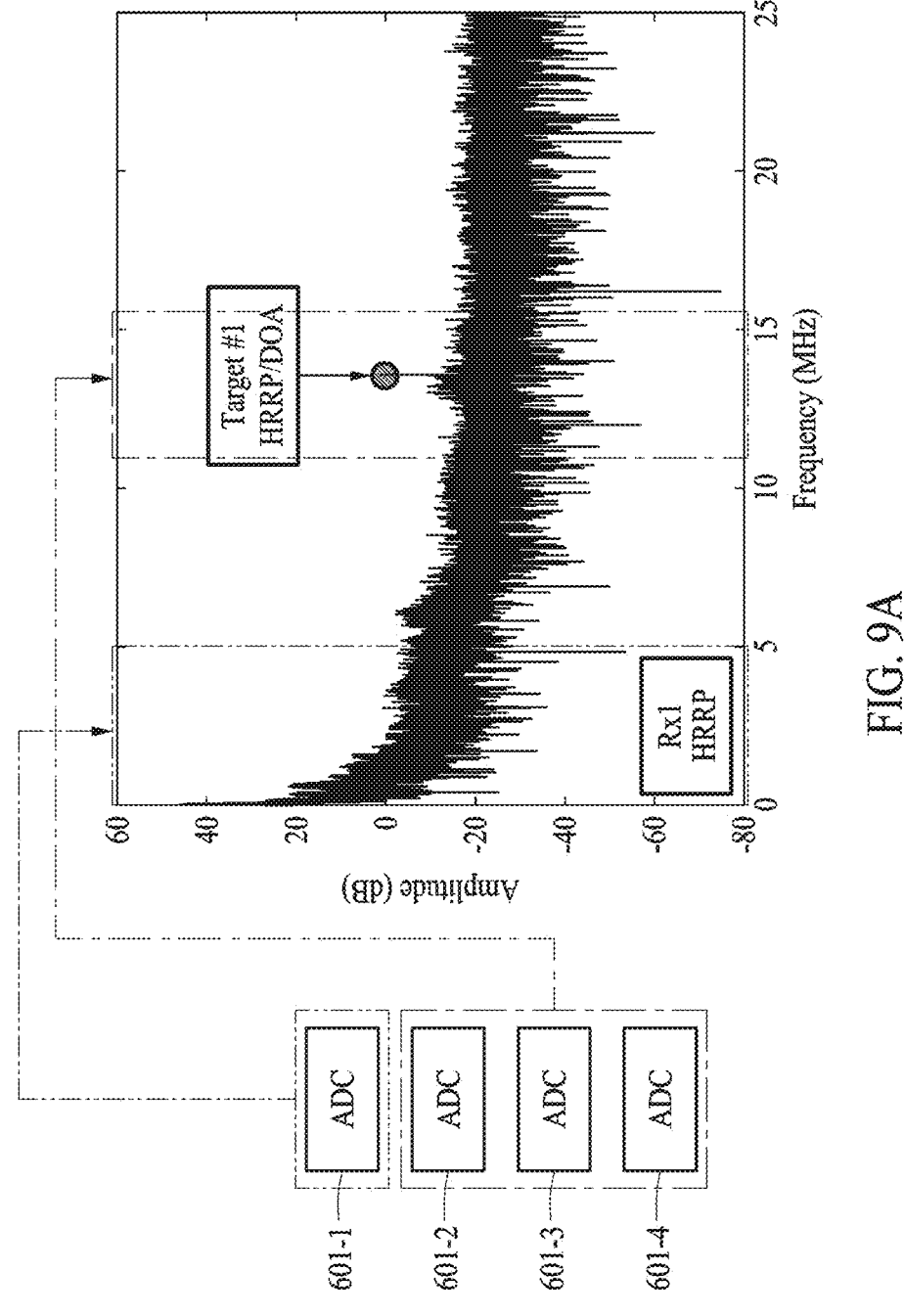
FIGS. 9A and 9B illustrate an example of a process in which a radar sensor obtains high-resolution distance information and angle information with respect to a detected target.
Figure 9B:
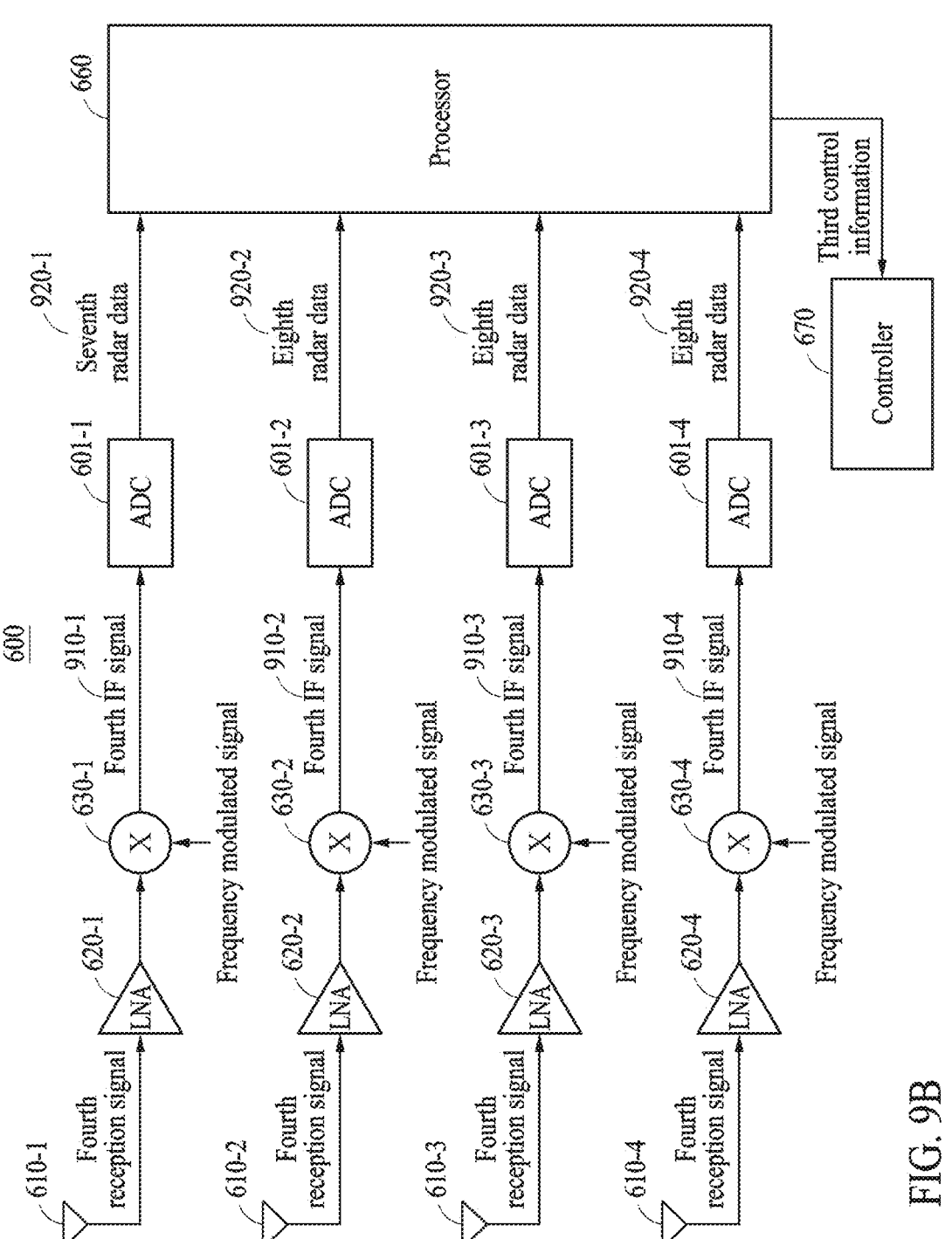

FIGS. 9A and 9B illustrate an example of a process in which a radar sensor obtains high-resolution distance information and angle information with respect to a detected target.

In an example of FIGS. 9A and 9B, the radar sensor 600 may detect one or more target in a low-resolution and long-range detection mode. In this example, the radar sensor 600 may obtain high-resolution distance information and angle information on the detected target and high-resolution information on a short range. Hereinafter, the example is described in detail with reference to FIGS. 9A and 9B.

In the example of FIG. 9A, the processor 660 may detect a target #1 based on a result of an FFT of radar data (or outputs of the ADCs 601-1 to 601-4 when operated in the low-resolution and long-range detection mode) collected in the low-resolution and long-range detection mode, and may calculate a range between the detected target #1 and the radar sensor 600.

The processor 660 may perform object classification on the detected target #1, and may compare a confidence score of a result of the object classification with a threshold value of the detected target #1. When the confidence score of the result of the object classification of the detected target #1 is less than the threshold value, the processor 660 may determine that high-resolution distance and angle information on the detected target #1 is to be generated.

When the processor 660 determines that the high-resolution distance and angle information on the detected target #1 is to be generated, the processor 660 may select one or more ADC for obtaining the high-resolution distance and angle information on the detected target #1 from among the ADCs 601-1 to 601-4.

In the example of FIG. 9A, the processor 660 may select the ADCs 601-2 to 601-4 from among the ADCs 601-1 to 601-4 to obtain the high-resolution distance and angle information on the detected target #1. The processor 660 may designate the remaining ADC 601-1 as an ADC for obtaining high-resolution information on a short range.

The processor 660 may determine third control information for changing a setting of each of the selected ADCs 601-2 to 601-4. The third control information may include, for example, an NCO shift and/or a decimation factor of each of the selected ADCs 601-2 to 601-4.

In an example, the processor 660 may determine (or calculate) an NCO shift of each of the selected ADCs 601-2 to 601-4 based on a range between the radar sensor 600 and the detected target #1. Each of the selected ADCs 601-2 to 601-4 may have the same NCO shift. The determined NCO shift of each of the selected ADCs 601-2 to 601-4 may be greater than the NCO shift of the remaining ADC 601-1.

In an example, the processor 660 may determine a decimation factor of each of the selected ADCs 601-2 to 601-4. Each of the selected ADCs 601-2 to 601-4 may have the same determined decimation factor. In the example of FIG. 9A, the determined decimation factor of each of the selected ADCs 601-2 to 601-4 may be determined to be the same as the decimation factor of the remaining ADC 601-1. This is only an example, and the determined decimation factor of each of the selected ADCs 601-2 to 601-4 may be different from the decimation factor of the remaining ADC 601-1.

In the example of FIG. 9B, the processor 660 may transmit the determined third control information to the controller 670.

The controller 670 may change a setting (e.g., the NCO shift and/or the decimation factor) of each of the selected ADCs 601-2 to 601-4 based on the received third control information.

The radar sensor 600 may amplify a frequency modulated signal and radiate (or output) the frequency modulated signal as a transmission signal (hereinafter, a "fourth transmission signal"), and reflected signals from which the fourth transmission signal is reflected by the target #1 may be received through the reception antennas 610-1 to 610-4. In the description of the example of FIG. 9B, the reflected signals received through the reception antennas 610-1 to 610-4 are referred to as "fourth reception signals".

Each of the fourth reception signals may be input to a respective one of the LNAs 620-1 to 620-4, and an output of each of the LNAs 620-1 to 620-4 may be input to a respective one of the frequency mixers 630-1 to 630-4.

Each of the frequency mixers 630-1 to 630-4 may mix the output of the respective one of the LNAs 620-1 to 620-4 with a frequency modulated signal to generate a respective one fourth IF signals 910-1 to 910-4. The fourth IF signals 910-1 to 910-4 may be input to the ADCs 601-1 to 601-4, respectively.

Each of the ADCs 601-1 to 601-4 may process a respective one the fourth IF signals 910-1 to 910-4. In the example of FIG. 9B, the ADC 601-1 may process (e.g., perform oversampling and DDC on) the fourth IF signal 910-1 to generate (or obtain) seventh radar data 920-1. The selected ADCs 601-2 to 601-4 may process (e.g., perform oversampling and DDC on) the fourth IF signals 710-2 to 710-4, respectively, to respectively generate (or obtain) eighth radar data 920-2, 920-3, and 920-4.

The processor 660 may receive the seventh radar data 920-1 from the ADC 601-1, and receive the eighth radar data 920-2, 920-3, and 920-4 respectively from the selected ADCs 601-2 to 601-4.

The processor 660 may obtain high-resolution distance and angle information on the detected target #1 based on the received eighth radar data 920-2, 920-3, and 920-4. The processor 660 may obtain high-resolution information on a short range based on the received seventh radar data 920-1.

The processor 660 may perform object classification and environment recognition based on the received seventh radar data 920-1 and the received eighth radar data 920-2, 920-3, and 920-4.

In addition, the processor 660 may perform various applications such as vehicle control and autonomous driving based on the received seventh radar data 920-1 and the received eighth radar data 920-2, 920-3, and 920-4.

In an example, the radar sensor 600 may determine settings of the ADCs 601-2 to 601-4 to be different from a setting of the ADC 601-1, to simultaneously obtain an HRRP/DOA of the detected target #1 and an HRRP of a short range.

The description provided with reference to FIGS. 1 to 6C may also apply to FIGS. 9A and 9B, and thus, a detailed description thereof is omitted.

Figure 10:
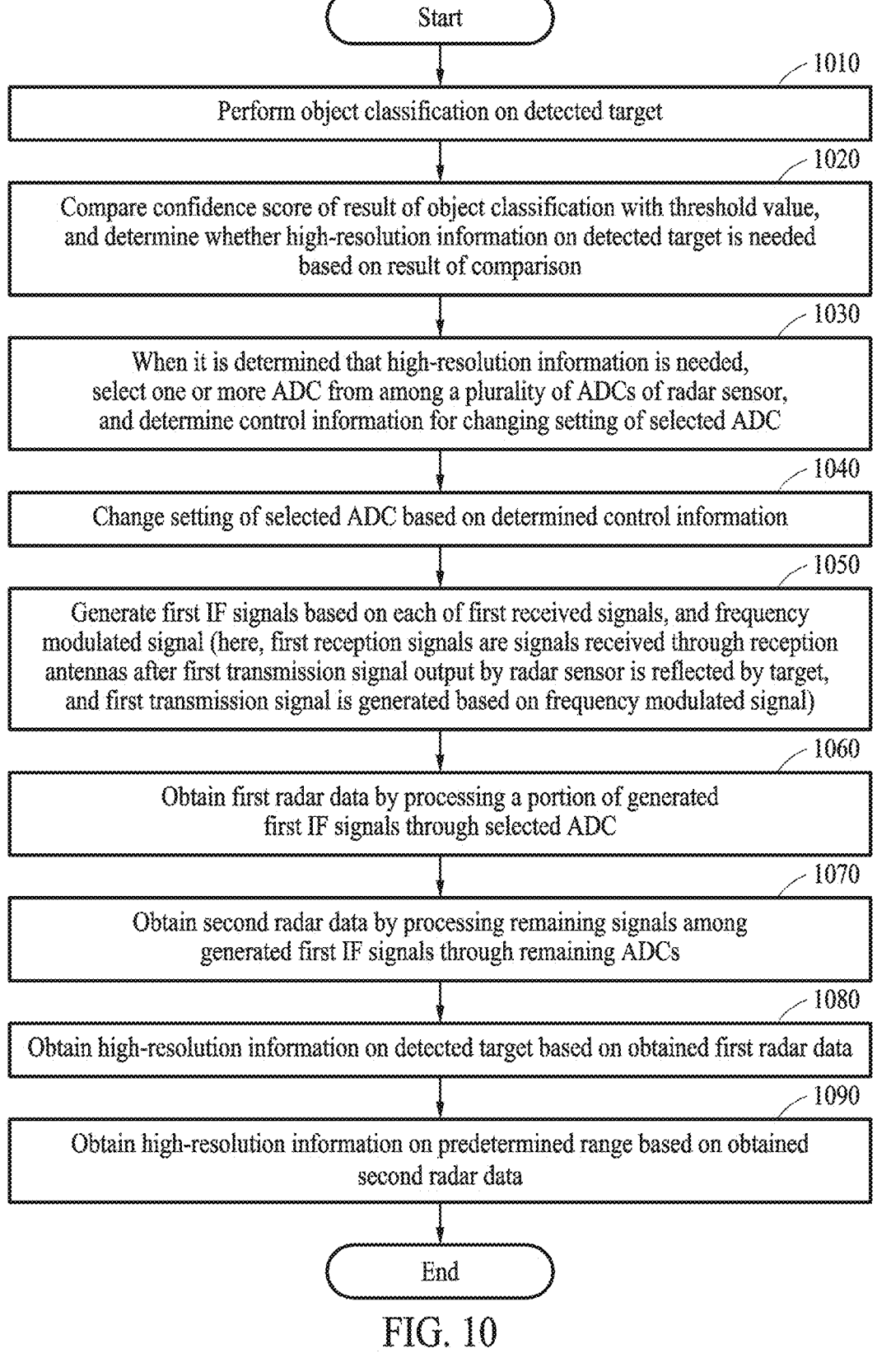
FIG. 10 is a flowchart illustrating an example of an operating method of a radar sensor.

FIG. 10 is a flowchart illustrating an example of an operating method of a radar sensor.

Referring to FIG. 10, in operation 1010, the radar sensors 200, 300, and 600 perform object classification on a detected target. For example, the radar sensors 200, 300, and 600 may detect a target based on radar data collected in a low-resolution and long-range detection mode, and may perform object classification on the detected target.

In operation 1020, the radar sensors 200, 300, and 600 may compare a confidence score of a result of the object classification with a threshold value, and determine whether high-resolution information on the detected target is to be generated based on a result of the comparison.

In operation 1030, when it is determined that the high-resolution information is to be generated, the radar sensors 200, 300, and 600 may select one or more ADC from among a plurality of ADCs (e.g., the ADCs 601-1 to 601-4 of FIGS. 6A to 6C) of the radar sensors 200, 300, and 600, and determine control information for changing a setting of the selected ADC (e.g., the ADC 601-4 of FIGS. 6A to 6C). For example, the processor 660 may determine a shift value for frequency-shifting an input signal of the selected ADC based on a distance between the detected target and the radar sensors 200, 300, and 600. The processor 660 may determine a decimation factor of the selected ADC to be greater than a decimation factor of each of the remaining ADCs.

In operation 1040, the radar sensors 200, 300, and 600 may change the setting of the selected ADC based on the determined control information. For example, the controller 670 may receive control information from the processor 660. The controller 670 may change a frequency of an NCO of the selected ADC by using the shift value of the received control information, and may change the decimation factor of the selected ADC to a decimation factor of the received control information. In another example, a frequency and a decimation factor of each of the remaining ADCs may be maintained.

In operation 1050, the radar sensors 200, 300, and 600 may generate first IF signals based on each of the first received signals, and a frequency modulated signal. The first reception signals may be signals received through reception antennas after a first transmission signal output by the radar sensors 200, 300, and 600 is reflected by a target, and the first transmission signal may be generated based on the frequency modulated signal.

In operation 1060, the radar sensors 200, 300, and 600 may obtain first radar data by processing a portion of the generated first IF signals (e.g., the first IF signal 640-4 of FIG. 6B) through the selected ADC. For example, the selected ADC may perform oversampling on a portion of the generated first IF signals to obtain first sample data, mix a signal (e.g., an output signal of an NCO with a changed frequency) having a changed frequency with the obtained first sample data to obtain first shifted data, and perform filtering on the obtained first shifted data. The selected ADC may obtain the first radar data by performing decimation on the filtered first shifted data based on the changed decimation factor.

In operation 1070, the radar sensors 200, 300, and 600 may obtain second radar data by processing remaining signals (e.g., the first IF signals 640-1 to 640-3 of FIG. 6B) among the generated first IF signals through the remaining ADCs. For example, the remaining ADCs may perform oversampling on the remaining signals among the generated first IF signals to obtain second sample data, and mix a signal (e.g., an output signal of an NCO with a maintained frequency) having a maintained frequency with the obtained second sample data to obtain second shifted data. The remaining ADCs may perform filtering on the obtained second shifted data, and may obtain the second radar data by performing decimation on the filtered second shifted data based on the maintained decimation factor.

In operation 1080, the radar sensors 200, 300, and 600 may obtain high-resolution information on the detected target based on the obtained first radar data.

In operation 1090, the radar sensors 200, 300, and 600 may obtain high-resolution information on a predetermined range (e.g., a short range) based on the obtained second radar data.

In an example, in operation 1010 (of operation 1090, for example), the radar sensors 200, 300, and 600 may further detect another target along with the target. In this example, the radar sensors 200, 300, and 600 may perform object classification on the detected other target, compare a confidence score of a result of the object classification of the detected other target with a threshold value to determine whether high-resolution information on the detected other target is to be generated.

When it is determined that the high-resolution information on each of the detected target and the detected other target is to be generated, the radar sensors 200, 300, and 600 may select a first ADC for obtaining the high-resolution information on the detected target and a second ADC for obtaining the high-resolution information on the detected other target, from among the ADCs.

The radar sensors 200, 300, and 600 may determine first control information for changing a setting of the selected first ADC and a setting of the selected second ADC. For example, the processor 660 may determine a shift value for frequency-shifting an input signal of the selected first ADC based on a distance between the detected target and the radar sensors 200, 300, and 600. The processor 660 may determine a shift value for frequency-shifting an input signal of the selected second ADC based on a distance between the detected other target and the radar sensors 200, 300, and 600. The processor 660 may determine a decimation factor of the selected first ADC and a decimation factor of the selected second ADC based on a confidence score of a result of the object classification of the detected target and a confidence score of a result of the object classification of the detected other target, respectively.

The radar sensors 200, 300, and 600 may change the settings of each of the selected first ADC and the selected second ADC based on the determined first control information. The determined first control information may include, for example, one or more of or all of a shift value for frequency-shifting an input signal of the selected first ADC, a shift value for frequency-shifting an input signal of the selected second ADC, a decimation factor of the selected first ADC, and a decimation factor of the selected second ADC.

The radar sensors 200, 300, and 600 may process second reception signals received through the reception antennas after a second transmission signal is reflected by the target and the other target, through a circuit (e.g., the first circuits 220 and 320) including the ADCs. For example, the circuit (e.g., the first circuits 220 and 320) may generate second IF signals based on each of the second reception signals and a frequency modulated signal, and obtain third radar data by processing a portion of the generated second IF signals (e.g., the second IF signal 710-4 of FIG. 7B) through the selected first ADC. The circuit (e.g., the first circuits 220 and 320) may obtain fourth radar data by processing another portion of the generated second IF signals (e.g., the second IF signal 710-3 of FIG. 7B) through the selected second ADC. The circuit (e.g., the first circuits 220 and 320) may obtain fifth radar data by processing remaining signals among the generated second IF signals (e.g., the second IF signals 710-1 and 710-2 of FIG. 7B) through the remaining ADCs.

The radar sensors 200, 300, and 600 may obtain high-resolution information on the detected target, high-resolution information on the detected other target, and high-resolution information on the predetermined range (e.g., a short range), based on a result processed by the circuit. For example, the processor 660 may obtain the high-resolution information on the detected target based on the obtained third radar data, and obtain the high-resolution information on the detected other target based on the obtained fourth radar data. The processor 660 may obtain the high-resolution information on the predetermined range (e.g., a short range) based on the obtained fifth radar data.

In an example, the radar sensors 200, 300, and 600 may obtain high-resolution information on a detectable range (or an entire detection range) of the radar sensors 200, 300, and 600 to more accurately determine whether a target is detected. More specifically, the radar sensors 200, 300, and 600 may control the ADCs so that the frequencies of the respective NCOs of the ADCs are different from each other. The radar sensors 200, 300, and 600 may process third reception signals received through the reception antennas after a third transmission signal is reflected by one or more targets, through a circuit (e.g., the first circuits 220 and 320) including the controlled ADCs. The radar sensors 200, 300, and 600 may obtain high-resolution information on each range based on the processing results of each of the third reception signals, and obtain high-resolution information on a detectable range of the radar sensors 200, 300, and 600 by concatenating the obtained high-resolution information on each range.

The description provided with reference to FIGS. 1 to 9B may also apply to the description of FIG. 10, and thus, a detailed description thereof is omitted.

The radar sensors, signal processing systems, antennas, first circuits, processors, controllers, FMCW signal generators, power amplifiers, LNAs, frequency mixers, ADCs, reception antennas, radar sensor 111, signal processing system 110, radar sensor 200, antennas 210, first circuit 220, processor 230, radar sensor 300, antennas 310-1, 311-1 to 311-n, first circuit 320, processor 330, controller 325, FMCW signal generator 321, power amplifier 322, LNAs 323-1 to 323-n, frequency mixers 324-1 to 324-n, ADCs 326-1 to 326-n, antennas 510, reception antennas 511 to 514, radar sensor 600, reception antennas 610-1 to 610-4, LNAs 620-1 to 620-4, frequency mixers 630-1 to 630-4, ADCs 601-1 to 601-4, processor 660, controller 670, and other apparatuses, units, modules, devices, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An operating method of a radar sensor, the operating method comprising:

performing object classification on a detected target;

comparing a confidence score of a result of the object classification with a threshold value;

determining that first high-resolution information on the detected target is to be generated based on a result of the comparison;

based on a result of a determination that the first high-resolution information is to be generated, selecting one or more of a plurality of analog-to-digital converters (ADCs) of the radar sensor, and determining control information for changing a setting of the selected one or more ADCs, the control information including a shift value being determined for frequency-shifting an input signal of the selected one or more ADCs based on a distance between the detected target and the radar sensor;

changing the setting of the selected one or more ADCs based on the determined control information;

generating first intermediate frequency signals based on respective first reception signals and a frequency modulated signal, the first reception signals being signals received through reception antennas after a first transmission signal output by the radar sensor is reflected by the detected target, and the first transmission signal being generated based on the frequency modulated signal;

generating first radar data by processing a portion of the generated first intermediate frequency signals through the selected one or more ADCs;

generating second radar data by processing remaining signals among the generated first intermediate frequency signals through remaining ADCs of the plurality of ADCs;

generating the first high-resolution information on the detected target based on the generated first radar data; and generating second high-resolution information on a predetermined range based on the generated second radar data.

2. The operating method of claim 1, wherein the determining of the control information comprises:

determining the shift value for frequency-shifting an input signal of the selected one or more ADCs based on the distance between the detected target and the radar sensor; and determining a decimation factor of the selected one or more ADCs to be greater than a decimation factor of each of the remaining ADCs.

3. The operating method of claim 2, wherein the changing of the setting comprises:

changing a frequency of a numerically controlled oscillator (NCO) of the selected one or more ADCs using the determined shift value; and changing the decimation factor of the selected one or more ADCs to the determined decimation factor, and a frequency and a decimation factor of an NCO of each of the remaining ADCs are maintained.

4. The operating method of claim 3, wherein the generating of the first radar data comprises:

performing oversampling on a portion of the generated first intermediate frequency signals to generate first sample data;

mixing a signal having the changed frequency and the generated first sample data to generate a first shifted data in which the generated first sample data is frequency-shifted;

performing filtering on the generated first shifted data; and generating the first radar data by performing decimation on the filtered first shifted data based on the changed decimation factor.

5. The operating method of claim 3, wherein the generating of the second radar data comprises:

performing oversampling on the remaining signals among the generated first intermediate frequency signals to generate second sample data;

mixing a signal of which a frequency is maintained and the generated second sample data to generate second shifted data in which the generated second sample data is frequency-shifted;

performing filtering on the generated second shifted data; and generating the second radar data by performing decimation on the filtered second shifted data based on the maintained decimation factor.

6. The operating method of claim 1, wherein the determining that the first high-resolution information is to be generated comprises determining that the first high-resolution information on the detected target is to be generated based on a determination that the confidence score being less than the threshold value.

7. The operating method of claim 1, further comprising:

based on a determination that another target being further detected along with the target, performing object classification on the detected other target, comparing a confidence score of a result of the object classification of the detected other target with the threshold value to determine that third high-resolution information on the detected other target is to be generated;

based on a determination that the first high-resolution information on each of the detected target and the third high-resolution information on the detected other target is to be generated, selecting a first ADC for generating the first high-resolution information on the detected target and a second ADC for generating the third high-resolution information on the detected other target, from among the ADCs;

determining first control information for changing a setting of the selected first ADC and a setting of the selected second ADC;

changing the setting of each of the selected first ADC and the selected second ADC based on the determined first control information;

processing second reception signals through a circuit comprising the ADCs, the second reception signals being signals received through reception antennas after a second transmission signal output by the radar sensor is reflected by the target and the other target, and the second transmission signal being a signal generated based on the frequency modulated signal; and generating the first high-resolution information on the detected target, the third high-resolution information on the detected other target, and the second high-resolution information on the predetermined range, based on a result of the processing of the second reception signals through the circuit.

8. The operating method of claim 7, wherein the determining of the first control information comprises:

determining a shift value for frequency-shifting an input signal of the selected first ADC based on a distance between the detected target and the radar sensor;

determining a shift value for frequency-shifting an input signal of the selected second ADC based on a distance between the detected other target and the radar sensor; and determining a decimation factor of the selected first ADC and a decimation factor of the selected second ADC based on a confidence score of a result of the object classification of the detected target and a confidence score of a result of the object classification of the detected other target, respectively.

9. The operating method of claim 7, wherein the processing through the circuit comprises:

generating second intermediate frequency signals based on each of the second reception signals, and the frequency modulated signal;

generating third radar data by processing a portion of the generated second intermediate frequency signals through the selected first ADC;

generating fourth radar data by processing another portion of the generated second intermediate frequency signals through the selected second ADC; and generating fifth radar data by processing remaining signals among the generated second intermediate frequency signals through remaining ADCs.

10. The operating method of claim 8, wherein the generating of the first high-resolution information on the detected target, the third high-resolution information on the detected other target, and the second high-resolution information on the predetermined range, based on the result processed by the circuit comprises:

generating the first high-resolution information on the detected target based on generated third radar data;

generating the third high-resolution information on the detected other target based on generated fourth radar data; and generating the second high-resolution information on the predetermined range based on generated fifth radar data.

11. The operating method of claim 1, further comprising:

controlling the ADCs such that frequencies of an NCO of each of the ADCs are different from each other;

processing third reception signals through a circuit comprising the controlled ADCs, the third reception signals being signals received through the reception antennas after a third transmission signal output by the radar sensor is reflected by one or more targets, and the third transmission signal being generated based on the frequency modulated signal;

generating high-resolution information for each range based on a processing result of each of the third reception signals; and generating high-resolution information on a detectable range of the radar sensor by concatenating the generated high-resolution information for the each range.

12. The operating method of claim 1, wherein the first high-resolution information on the detected target comprises either one or both of a distance and an angle to the detected target.

13. A radar sensor, comprising:

a plurality of antennas;

a first circuit electrically connected to the antennas and comprising a plurality of analog-to-digital converters (ADCs); and one or more processors configured to:

perform object classification on a detected target;

compare a confidence score of a result of the object classification with a threshold value;

determine that first high-resolution information on the detected target is to be generated based on a result of the comparison; and based on a determination that the first high-resolution information is to be generated, select one or more of the ADCs, determine control information for changing a setting of the selected one or more ADCs, the control information including a shift value being determined for frequency-shifting an input signal of the selected one or more ADCs based on a distance between the detected target and the radar sensor, and transmit the determined control information to the first circuit, wherein the first circuit is configured to:

change the setting of the selected one or more ADCs based on the determined control information;

generate first intermediate frequency signals based on respective first reception signals and a frequency modulated signal; and generate first radar data by processing a portion of the generated first intermediate frequency signals through the selected one or more ADCs, generate second radar data by processing remaining signals among the generated first intermediate frequency signals through remaining ADCs of the ADCs, and transmit the generated first radar data and the generated second radar data to the one or more processors, wherein the one or more processors are configured to generate the first high-resolution information on the detected target based on the generated first radar data, and generate second high-resolution information on a predetermined range based on the generated second radar data, and wherein first reception signals are signals received through reception antennas after a first transmission signal output by a transmission antenna is reflected by the target, and the first transmission signal is generated based on the frequency modulated signal.

14. The radar sensor of claim 13, wherein, for the determining of the control information, the one or more processors are configured to:

determine a shift value for frequency-shifting an input signal of the selected one or more ADCs based on a distance between the detected target and the radar sensor; and determine a decimation factor of the selected one or more ADCs to be greater than a decimation factor of each of the remaining ADCs.

15. The radar sensor of claim 14, wherein for the changing of the setting, the first circuit is configured to change a frequency of a numerically controlled oscillator (NCO) of the selected one or more ADCs using the determined shift value, and change the decimation factor of the selected one or more ADCs to the determined decimation factor, and a frequency and a decimation factor of an NCO of each of the remaining ADCs are maintained.

16. The radar sensor of claim 13, wherein, for the determining that the first high-resolution information is to be generated, the one or more processors are configured to determine that the first high-resolution information on the detected target is to be generated based on a determination that the confidence score is less than the threshold value.

17. The radar sensor of claim 13, wherein the one or more processors are configured to:

based on a determination that another target is further detected along with the target, perform object classification on the detected other target, compare a confidence score of a result of the object classification of the detected other target with a threshold value to determine that third high-resolution information on the detected other target is to be generated;

based on a determination that the first high-resolution information on the detected target and the third high-resolution information on the detected other target is to be generated, select a first ADC for generating the first high-resolution information on the detected target and a second ADC for generating the third high-resolution information on the detected other target, from among the ADCs;

determine first control information for changing a setting of the selected first ADC and a setting of the selected second ADC; and transmit the determined first control information to the first circuit, and the first circuit is configured to change the setting of each of the selected first ADC and the selected second ADC based on the determined first control information, process second reception signals, and transmit a processing result of the second reception signals to the one or more processors, and the second reception signals are signals received through the reception antennas after a second transmission signal output by the transmission antenna is reflected by the target and the other target, and the second transmission signal is generated based on the frequency modulated signal.

18. The radar sensor of claim 17, wherein, for the determining of the first control information, the one or more processors are configured to:

determine a shift value for frequency-shifting an input signal of the selected first ADC based on a distance between the detected target and the radar sensor, determine a shift value for frequency-shifting an input signal of the selected second ADC based on a distance between the detected other target and the radar sensor, and determine a decimation factor of the selected first ADC and a decimation factor of the selected second ADC based on a confidence score of a result of the object classification of the detected target and a confidence score of a result of the object classification of the detected other target, respectively.

19. The radar sensor of claim 13, wherein the first circuit is configured to control the ADCs so that frequencies of an NCO of each of the ADCs are different from each other, process third reception signals using the controlled ADCs, and transmit processing results of each of the third reception signals to the one or more processors, and the one or more processors are configured to generate respective high-resolution information for each range based on the processing results of each of the third reception signals, and generate fourth high-resolution information on a detectable range of the radar sensor by concatenating the generated respective high-resolution information for the each range, and the third reception signals are signals received through the reception antennas after a third transmission signal output by the transmission antenna is reflected by one or more targets, and the third transmission signal is generated based on the frequency modulated signal.

20. The radar sensor of claim 13, comprised in advanced driver assistance systems (ADAS).

21. A signal processing system comprising the radar sensor of claim 13.

22. An operating method of a radar sensor, the operating method comprising:

performing object classification on a detected target;

based on a determination that a confidence score of a result of the object classification is less than a threshold value, determining control information for changing parameter setting of one or more of a plurality of analog-to-digital converters (ADCs) of the radar sensor, the control information including a shift value being determined for frequency-shifting an input signal of the selected one or more ADCs based on a distance between the detected target and the radar sensor;

generating first high-resolution information on the detected target based on first radar data, the first radar data being generated based on a portion of intermediate frequency signals using the one or more ADCs of which the parameter setting is changed based on the determined control information; and generating second high-resolution information on a predetermined range based on second radar data, the second radar data being generated based on remaining signals of the Intermediate frequency signals using one or more remaining ADCs of the plurality of ADCs.

23. The operating method of claim 22, wherein the parameter setting of the one or more ADCs is different than a parameter setting of the one or more remaining ADCs used to generate the second radar data.

24. The operating method of claim 22, wherein the one or more of the ADCs comprises a first ADC and a second ADC, and the determining of the control information comprises determining a decimation factor of the second ADC to be greater than a decimation factor of the first ADC, based on a determination that the confidence score of a result of object classification of a second detected target being is greater than the confidence score of the result of the object classification of the detected target.

25. The operating method of claim 22, wherein the intermediate frequency signals are generated based on respective reception signals and a frequency modulated signal, the reception signals are received through reception antennas of the radar sensor after a transmission signal output by the radar sensor is reflected by the detected target, and the transmission signal is generated based on the frequency modulated signal.

* * * * *